(12) United States Patent
Yano et al.

(10) Patent No.: US 12,347,286 B2
(45) Date of Patent: Jul. 1, 2025

(54) WATER AREA MONITORING DEVICE, WATER AREA MONITORING SYSTEM, WATER AREA MONITORING METHOD, AND RECORDING MEDIUM

(71) Applicant: NEC Corporation, Tokyo (JP)

(72) Inventors: Yutaka Yano, Tokyo (JP); Eitaro Misumi, Tokyo (JP); Kenichi Nomura, Tokyo (JP); Makoto Ogawa, Tokyo (JP); Jun Muramatsu, Tokyo (JP); Masaki Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 194 days.

(21) Appl. No.: 18/025,268

(22) PCT Filed: Jul. 14, 2021

(86) PCT No.: PCT/JP2021/026481
§ 371 (c)(1),
(2) Date: Mar. 8, 2023

(87) PCT Pub. No.: WO2022/059322
PCT Pub. Date: Mar. 24, 2022

(65) Prior Publication Data
US 2023/0326309 A1    Oct. 12, 2023

(30) Foreign Application Priority Data
Sep. 17, 2020    (JP) ................. 2020-156066

(51) Int. Cl.
*G08B 13/16*    (2006.01)
*G01H 9/00*    (2006.01)

(52) U.S. Cl.
CPC ......... *G08B 13/1672* (2013.01); *G01H 9/004* (2013.01)

(58) Field of Classification Search
CPC .................................................. G08B 13/1672
See application file for complete search history.

(56) References Cited

U.S. PATENT DOCUMENTS 11,476,930 B2 *  10/2022  Matsumoto ........... H04B 10/071
11,483,067 B2 *  10/2022  Matsumoto ........ G01M 11/3136
(Continued)

FOREIGN PATENT DOCUMENTS

CN    207197659 U    4/2018
CN    108986363 A    12/2018
(Continued)

OTHER PUBLICATIONS

International Search Report for PCT Application No. PCT/JP2021/026481, mailed on Oct. 12, 2021.
(Continued)

*Primary Examiner* — Travis R Hunnings

(57) ABSTRACT

In order to facilitate fixed-point monitoring over a wide area and for a long time, this water area monitoring device comprises: a detection unit for information, such as water area intrusion, which detects, from sound data that is acquired by means of optical fibers installed in the water or the water bottom and is data pertaining to a sound or a vibration at the respective positions of the optical fibers, at least any one among sounds of water area intrusion or the like that indicate intrusion into a target water area or water area intrusion or the like, which is a prescribed behavior in the target water area, at a time at which sound data is acquired, and changes in sounds or vibrations not caused by the water area intrusion or the like; and an output unit which outputs information indicating the sound such as water area intrusion.

18 Claims, 11 Drawing Sheets

(56) References Cited

U.S. PATENT DOCUMENTS

| | | | |
|---|---|---|---|
| 11,643,923 B2* | 5/2023 | Thiruvenkatanathan | ................... E21B 47/107 367/86 |
| 11,698,278 B2* | 7/2023 | de Joode | ............... G01H 9/004 73/655 |
| 11,802,810 B2* | 10/2023 | Xia | ........................ G01M 7/00 |
| 2012/0180552 A1 | 7/2012 | Calvo et al. | |
| 2019/0197846 A1* | 6/2019 | Englund | ............. H04R 23/008 |

FOREIGN PATENT DOCUMENTS

| | | |
|---|---|---|
| JP | S58-088871 U | 6/1983 |
| JP | 2000-076560 A | 3/2000 |
| JP | 2005-055257 A | 3/2005 |
| JP | 2007-286885 A | 11/2007 |
| JP | 2014-502345 A | 1/2014 |
| JP | 2019-529952 A | 10/2019 |

OTHER PUBLICATIONS

English translation of Written opinion for PCT Application No. PCT/JP2021/026481, mailed on Oct. 12, 2021.
R. Posey Jr, G. A. Johnson and S.T. Vohra, "Strain sensing based on coherent Rayleigh scattering in an optical fibre", Electronics Letters, Sep. 28, 2000, vol. 36 No. 20, p. 1688-p. 1689.

* cited by examiner

WATER AREA MONITORING DEVICE, WATER AREA MONITORING SYSTEM, WATER AREA MONITORING METHOD, AND RECORDING MEDIUM

This application is a National Stage Entry of PCT/JP2021/026481 filed on Jul. 14, 2021, which claims priority from Japanese Patent Application 2020-156066 filed on Sep. 17, 2020, the contents of all of which are incorporated herein by reference, in their entirety.

TECHNICAL FIELD

The present invention relates to a system that monitors intrusion in a target water area or an action in the target water area.

BACKGROUND ART

In recent years, for security at a harbor or the like, poaching monitoring, and the like, a technique for monitoring intrusion into a water area being monitored (target water area) and an action in a target water area (hereinafter, referred to as "intrusion or the like") has been required.

As methods for monitoring intrusion or the like in a target water area, the following three forms may be mainly considered. The first form is monitoring by a vessel, a helicopter, a drone, or the like. The second form is monitoring by a camera or a radar from a high place on land (e.g., see PTL 1). The third form is monitoring of underwater sound by using an underwater microphone installed in water (e.g., see PTL 2).

Herein, in monitoring by a vessel, a helicopter, a drone, or the like, constantly monitoring a wide water area at night as well leads to a high requirement in terms of labor and expense, and therefore, an applicable monitoring target is limited. Thus, a technique for constantly monitoring remotely is required.

Herein, Japanese Patent Application No. 2020-013946 discloses a method of acquiring a sound around an optical fiber by distributed acoustic sensing (DAS). NPL 1 discloses a principle of DAS.

CITATION LIST

Patent Literature

PTL 1: Japanese Unexamined Patent Application Publication No. 2005-055257
PTL 2: Japanese Unexamined Utility Model Application Publication No. S58-088871

Non Patent Literature

NPL 1: R. Posey Jr, G. A. Johnson and S. T. Vohra, "Strain sensing based on coherent Rayleigh scattering in an optical fibre", ELECTRONICS LETTERS, 28th September 2000, Vol. 36 No. 20, pp. 1688 to 1689

SUMMARY OF INVENTION

Technical Problem

In optical remote monitoring with a monitoring camera or the like described in a paragraph of Background Art, and remote monitoring by an electromagnetic wave with a radar or the like, a monitoring device needs to be installed at a land place where the sea can be seen, and therefore, a monitoring range is limited to a coast, and accuracy of monitoring is subject to weather.

In monitoring by an underwater microphone, it is possible to install a monitoring device in a place that is away from land by using an underwater cable with which communication and power feeding are performed. However, since an electronic circuit is used, it is difficult to maintain reliability due to insulation failure and the like in water. Further, in monitoring by an underwater microphone, a large number of pieces of underwater microphone equipment need to be installed in the sea in such a way as not to be carried away by a wave or a tide.

Thus, in a method by an underwater microphone, it is difficult to maintain an observation point for a long period, and it is not easy to largely increase the number of observation points. Further, monitoring by an underwater microphone needs to communicate observation information to land in real time, but connecting a plurality of microphones to one cable and conveying all pieces of observation information to land needs an advanced technique. There is also a constraint in power supply, whereby sufficient environmental information acquisition may not be performed, and there is a possibility that an event is missed.

An object of the present invention is to provide a water area monitoring device and the like that facilitate fixed-point monitoring over a wide range and for a long period.

Solution to Problem

A water area monitoring device according to the present invention includes: an information detection unit for water area intrusion or the like that detects, from sound data being data acquired by an optical fiber installed in water or on a water bottom and relating to a sound or vibration at each position of the optical fiber, at least one of a sound of water area intrusion or the like being a sound representing intrusion in a target water area or water area intrusion or the like being a predetermined behavior in the target water area, at a time when the sound data are acquired, and a change of the sound or vibration due to the water area intrusion or the like from a matter that is not the water area intrusion or the like; and an output unit that outputs information representing the sound of the water area intrusion or the like.

Advantageous Effects of Invention

An object of the present invention is to provide a water area monitoring device and the like that facilitate fixed-point monitoring over a wide range and for a long period.

BRIEF DESCRIPTION OF DRAWINGS

FIG. 6 is a conceptual diagram (part 1) illustrating a third specific example of an operation performed by a sound classification unit for water area intrusion or the like.

FIG. 7 is a conceptual diagram (part 2) illustrating the third specific example of an operation performed by the sound classification unit for water area intrusion or the like.

FIG. 8 is a conceptual diagram (part 1) illustrating a fourth specific example of an operation performed by the sound classification unit for water area intrusion or the like.

FIG. 9 is a conceptual diagram (part 2) illustrating the fourth specific example of an operation performed by the sound classification unit for water area intrusion or the like.

EXAMPLE EMBODIMENT

First Example Embodiment

A water area monitoring system and the like according to the present example embodiment acquires sound data for monitoring intrusion or the like in a target water area, by use of DAS described in a paragraph of Background Art, and further, by use of an optical fiber provided in an optical cable. Thereby, the water area monitoring system according to the present example embodiment lightens labor of monitoring intrusion or the like in a target water area, and facilitates fixed-point monitoring over a wide range and for a long period.

For example, human swimming force using a fin of a diver or the like, an underwater scooter (diver propulsion vehicle), a raft, a boat, a personal watercraft, a ship, a submersible vessel, a submarine, and the like are considered as an intrusion means into a water area being monitored (target water area). It is known that each of the means emits a characteristic sound. A sound source of a sound with such a characteristic is involved with generation of propulsion force, such as an engine sound, a motor sound, a screw sound, and a hand rowing sound, and a sound tends to be louder as a movement speed is higher. A diver also emits an exhaust sound.

Meanwhile, some action, such as an illegal behavior or a nuisance, may be performed in the target water area. In such a case, a work sound or the like involved with the behavior becomes a key for sensing the behavior. For example, when a behavior such as poaching, destruction, or illegal dumping is performed, there is a possibility that the following sounds occur. Specifically, the sounds are a cutting sound of a net or a wire, an operation sound of a tool such as opening of a hole, an operation sound of a hoisting machine or a lifting machine, a sound of scraping off a material stuck to a rock, a sound of absorbing an underwater object, a sound of putting in and pulling up a net, a sound of dropping something, a sound of something reaching a bottom, and the like.

The water area monitoring system according to the present example embodiment detects a sound having a characteristic as described above, and monitors intrusion in a target water area or a behavior in a target water area.

Figure 1:
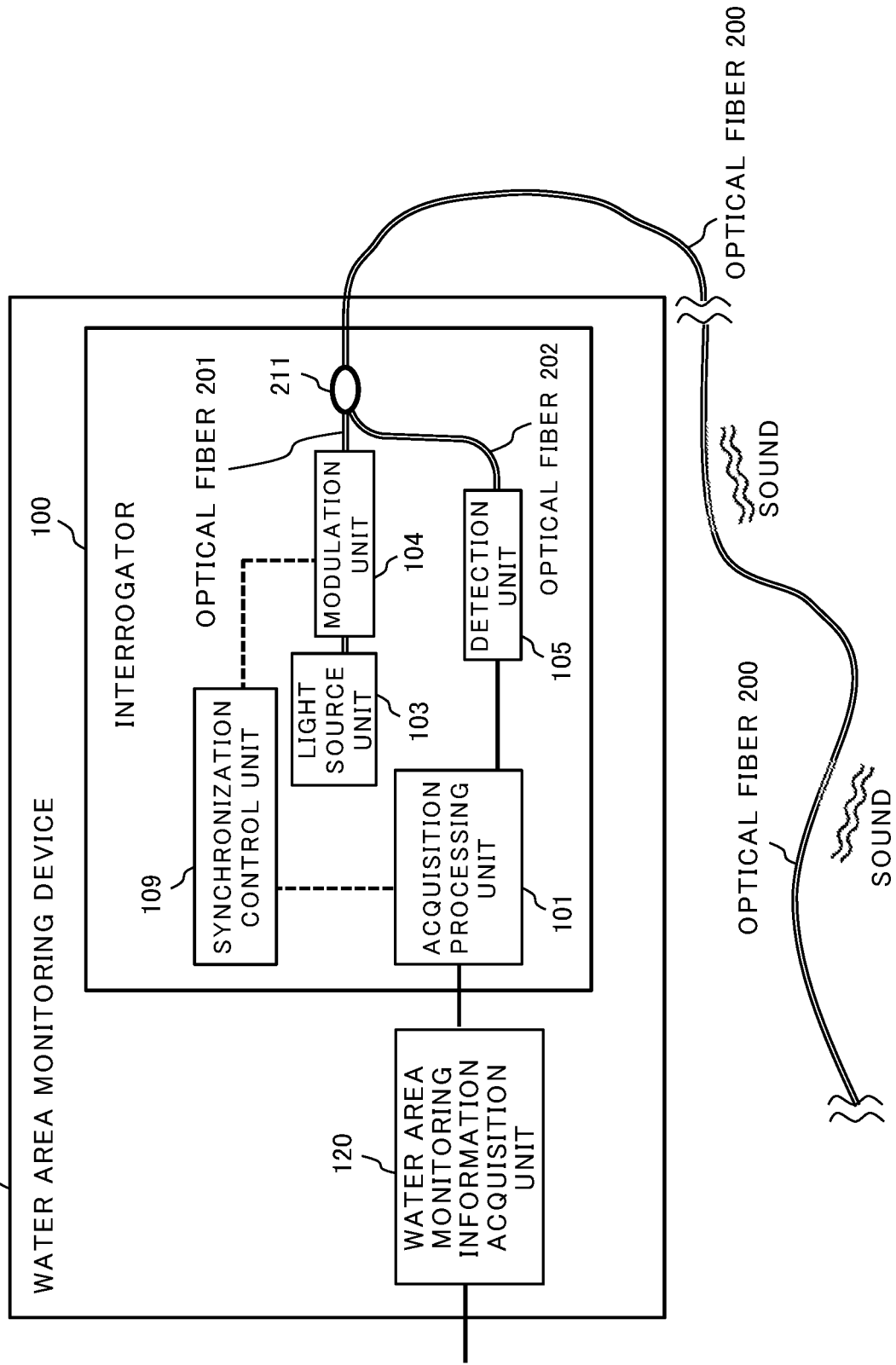
FIG. 1 is a conceptual diagram illustrating a configuration example of a water area monitoring system according to a first example embodiment.

FIG. 1 is a conceptual diagram illustrating a configuration of a water area monitoring system 300 being an example of the water area monitoring system according to the present example embodiment. The water area monitoring system 300 includes a water area monitoring device 140 and an optical fiber 200. The water area monitoring device 140 includes an interrogator 100 and a water area monitoring information acquisition unit 120. Herein, the interrogator is interrogator in English notation.

Figure 2:
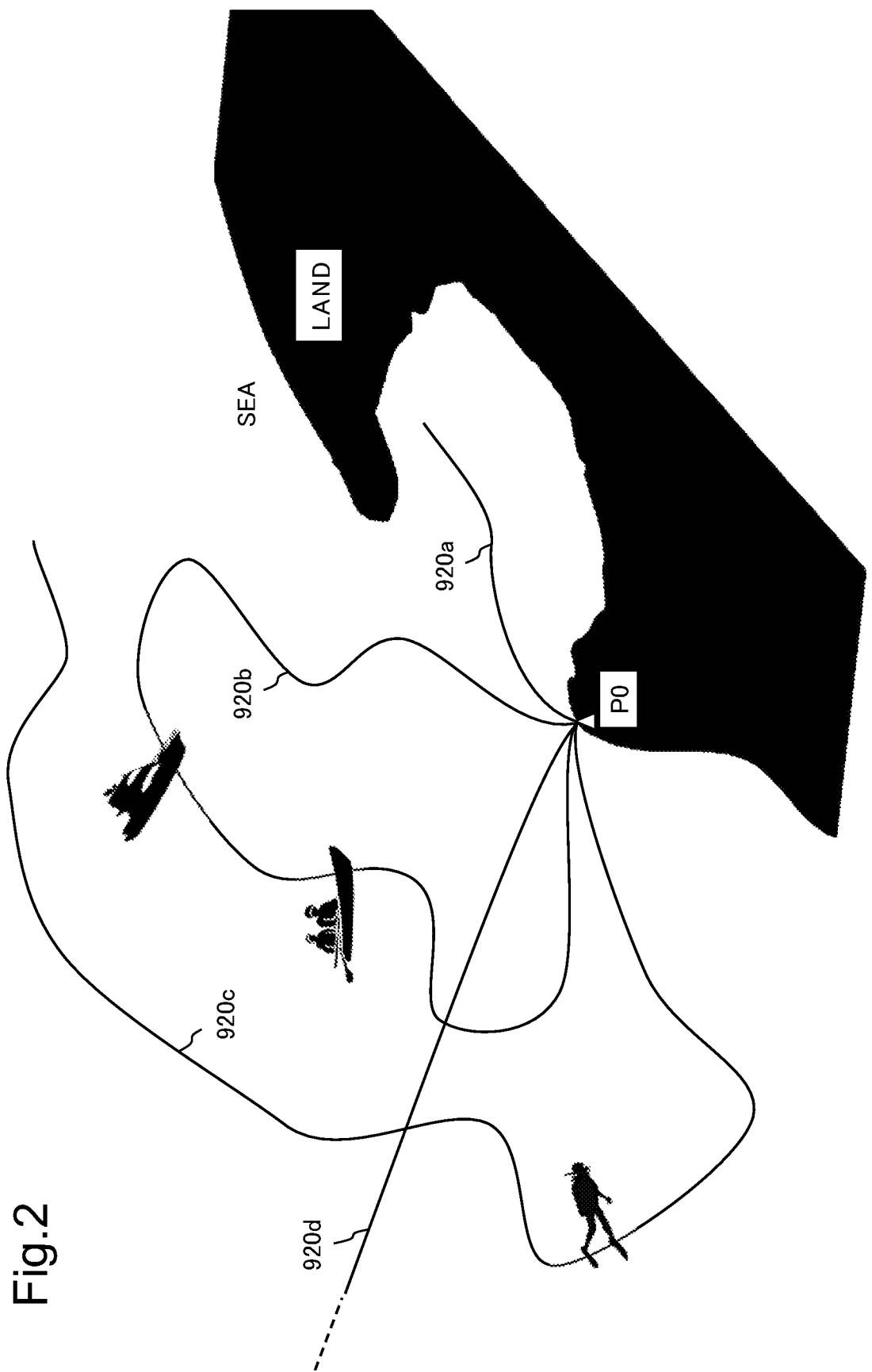
FIG. 2 is a conceptual diagram illustrating an example of how the water area monitoring system is installed.

FIG. 2 is a conceptual diagram illustrating an example of how the water area monitoring system 300 in FIG. 1 is installed. Submarine cables 920a to 920d are, for example, general submarine cables used for a purpose such as optical communication. The submarine cables 920a-d are installed on a sea bottom or undersea from a position P0 being a cable landing point.

FIG. 2 illustrates one example of how a submarine cable is laid when an application of monitoring intrusion into a certain bay part is assumed. In order to find a behavior such as intrusion before occurrence, a submarine cable equipped with the optical fiber 200 in FIG. 1 is not only laid in the bay, as the submarine cable 920a, but also laid in such a way as to widely cover a water area at an entrance of the bay, as the submarine cable 920b or 920c. For optical fiber sensing, only one end of a submarine cable needs to be landed on the P0. However, landing the submarine cable in a loop-shape similarly to the submarine cable 920b enables minimization of a decrease in a range of a monitored water area by measuring from another end as well, when the submarine cable is cut in a middle.

Figure 3A:
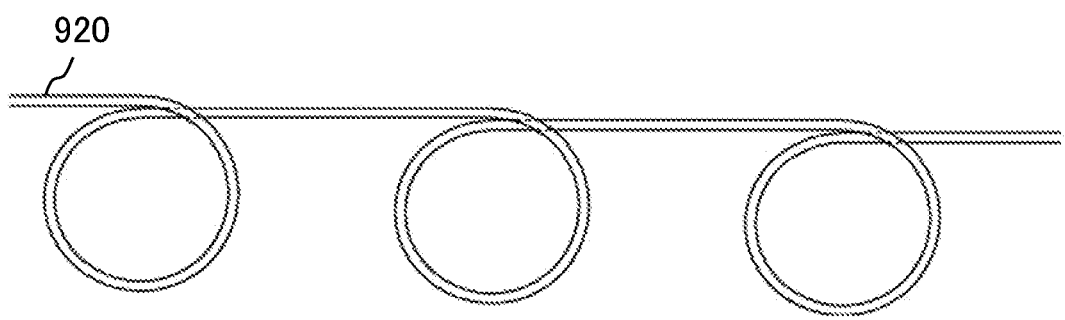
FIG. 3A is a conceptual diagram illustrating an example of how a submarine cable is laid.
Figure 3B:
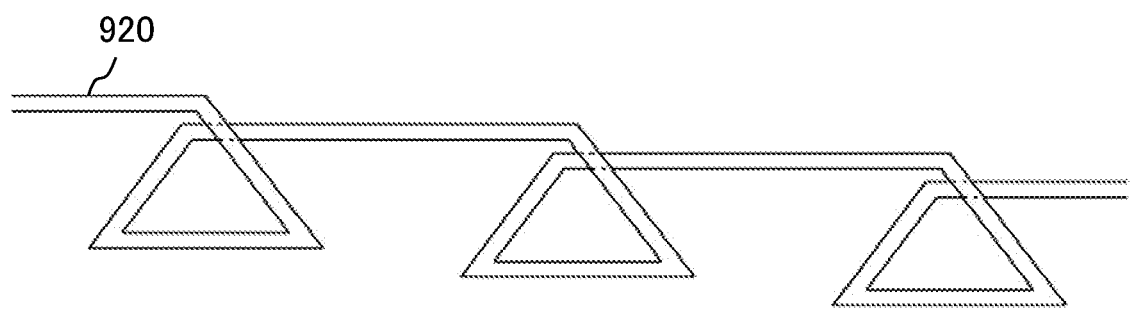
FIG. 3B is a conceptual diagram illustrating another example of how a submarine cable is laid.

Further, in order to more abundantly acquire spatial information of a sound which is described later, specifically, information on a position of a sound source, it is desirable that, when a plurality of submarine cables to be sensors are arranged, the submarine cables be laid without being parallel to each other, in such a way as not to be at a similar angle to a sound source. In order to increase a variation of an angle between a submarine cable and a sound source, a submarine cable equipped with the optical fiber 200 in FIG. 1 may be laid partially in a circular shape, for example, as the submarine cable 920 illustrated in FIG. 3A. Alternatively, a submarine cable may be partially laid in a triangular shape, as the submarine cable 920 illustrated in FIG. 3B. A submarine cable equipped with the optical fiber 200 in FIG. 1 may be not only installed on a water bottom but may also be arranged in water. For arrangement in water, the submarine cable may be partially lifted water by use of a mooring buoy or the like.

A submarine cable equipped with the optical fiber 200 in FIG. 1 may serve for another application, such as a communication cable. For example, the submarine cable 920d in FIG. 2 may be a communication cable connecting a land across a sea to the P0, and may have a portion close to land used for a monitoring application as well.

The optical fiber 200 in FIG. 1 is one of a plurality of optical fibers included in the submarine cable 920. The optical fiber 200 may be used for optical communication, or may be dedicated to monitoring of water area intrusion or the like.

The water area monitoring device 140 in FIG. 1 is installed near the position P0, for example, together with a device for optical communication. The water area monitoring device 140 may be installed on land, or may be installed on a ship such as a monitoring ship.

The water area monitoring information acquisition unit 120 may be installed near the interrogator 100, or may be installed away from the interrogator 100. The water area monitoring information acquisition unit 120 is desirably placed at a place where a monitoring person can receive an output in real time.

The optical fiber 200 is a general optical fiber, and an optical fiber provided in a submarine cable or the like being installed for a purpose other than water area monitoring, such as optical transmission, may be utilized. A general optical fiber produces backscattering light that has been subjected to a change due to an environment such as presence of vibration including a sound. The backscattering light is typically due to Rayleigh backscattering. In such a case, the change is mostly a change of a phase (phase change).

The optical fiber 200 may be an optical fiber in which a plurality of optical fibers are connected by an amplification repeater or the like. A cable including the optical fiber 200 may be connected between an optical communication device (not illustrated) including the interrogator 100 and another optical communication device. The submarine cable 920 may also serve for another application such as optical transmission, a cable-type wave gauge, or a cable-type ocean-bottom seismometer, or may be an optical cable dedicated to monitoring of water area intrusion or the like. The submarine cable 920 includes a plurality of optical fiber core wires within a cable, varies wavelengths from each other even within the same optical fiber core wire, and thereby enables another system and the water area monitoring system according to the present example embodiment to coexist.

It is essential for laying and landing of a communication submarine cable to acquire consent of a fishery operator performing fishing in an installation water area. Since monitoring around a submarine cable may be performed by applying the present example embodiment to the communication submarine cable, there is a possibility that the monitoring information helps monitor poaching or the like, by being provided to a local fishery operator. Thereby, an effect in which it becomes easier to gain cooperation for laying or landing of a communication submarine cable may also be expected.

<Operation of the Interrogator 100>

The interrogator 100 is an interrogator for performing OTDR-type optical fiber sensing. Herein, OTDR is an abbreviation of optical time-domain reflectometry. Regarding such an interrogator, there is a description in, for example, Japanese Patent Application No. 2020-013946 described above.

The interrogator 100 in FIG. 1 includes an acquisition processing unit 101, a synchronization control unit 109, a light source unit 103, a modulation unit 104, and a detection unit 105. The modulation unit 104 is connected to the optical fiber 200 via an optical fiber 201 and an optical coupler 211, and the detection unit 105 is connected to the optical fiber 200 via the optical coupler 211 and the optical fiber 202.

The light source unit 103 includes a laser light source, and causes continuous laser light to enter the modulation unit 104.

The modulation unit 104 performs, for example, amplitude modulation of laser light of continuous light that has been caused to enter from the light source unit 103, synchronously with a trigger signal from the synchronization control unit 109, and generates probe light of a sensing signal wavelength. The probe light is, for example, pulsed. Then, the modulation unit 104 sends the probe light to the optical fiber 200 via the optical fiber 201 and the optical coupler 211.

The synchronization control unit 109 also sends a trigger signal to the acquisition processing unit 101, and communicates which part of continuously analog/digital (A/D)-converted and input data is a time origin.

When the sending of the probe light is performed, a part of light scattered at each position of the optical fiber 200 becomes return light, and reaches the detection unit 105 from the optical coupler 211 via the optical fiber 202. Return light from each position of the optical fiber reaches the interrogator 100 in a shorter time after sending of probe light is performed, as the position is closer to the interrogator 100. Then, when a certain position of the optical fiber 200 is influenced by an environment such as presence of a sound, a change from probe light at sending is made, due to the environment, in backscattering light generated at the position. When backscattering light is Rayleigh backscattering light, the change is mostly a phase change.

Return light in which the phase change is generated is detected by the detection unit 105. For a method of the detection, synchronous detection and delay detection are known, and either method may be used. Since a configuration for performing phase detection is known, description thereof is omitted herein. An electric signal (detection signal) acquired by detection represents a degree of a phase change by amplitude or the like. The electric signal is input to the acquisition processing unit 101.

The acquisition processing unit 101 first A/D-converts the electric signal described above into digital data. Then, a phase change from a previous measurement, of light that has been scattered at each point of the optical fiber 200 and has returned is derived in a form of, for example, a difference from the previous measurement at the same point. Since the signal processing is a general technique of DAS, detailed description thereof is omitted.

The acquisition processing unit 101 derives data in a form similar to that acquired by virtually arranging a string of dotted electric sensors, at each sensor position of the optical fiber 200. The data are virtual sensor array output data acquired as a result of signal processing, but are hereinafter referred to as RAW data for simplification of description. RAW data are data representing instantaneous intensity (waveform) of a sound detected by an optical fiber at each time and at each point (sensor position) of the optical fiber 200. Regarding RAW data, there is description in, for example, a paragraph of Background Art of Japanese Patent Application No. 2020-013946 described above. The acquisition processing unit 101 outputs the RAW data to the water area monitoring information acquisition unit 120.

<Operation of the Water Area Monitoring Information Acquisition Unit 120>

Various sounds and vibrations (hereinafter, simply be referred to as a "sound") exist in water. The water area monitoring information acquisition unit 120 first detects a sound of intrusion or the like from among the sounds. Herein, a sound of intrusion or the like refers to a sound generated by an agent (a person or an object) itself that has intruded into a target water area (hereinafter, referred to as an "agent of intrusion or the like"), or a sound derived from an action of the agent of intrusion or the like in a target water area.

The water area monitoring information acquisition unit 120 derives, from RAW data input from the acquisition processing unit 101, sound detection information of intrusion or the like being information representing when, at which position of the optical fiber 200, and what kind of a sound of intrusion or the like is detected. The configuration of the water area monitoring information acquisition unit 120 is described with reference to FIG. 4. Details of an operation of the water area monitoring information acquisition unit 120 will be described later with reference to FIGS. 5 to 9.

Figure 4:
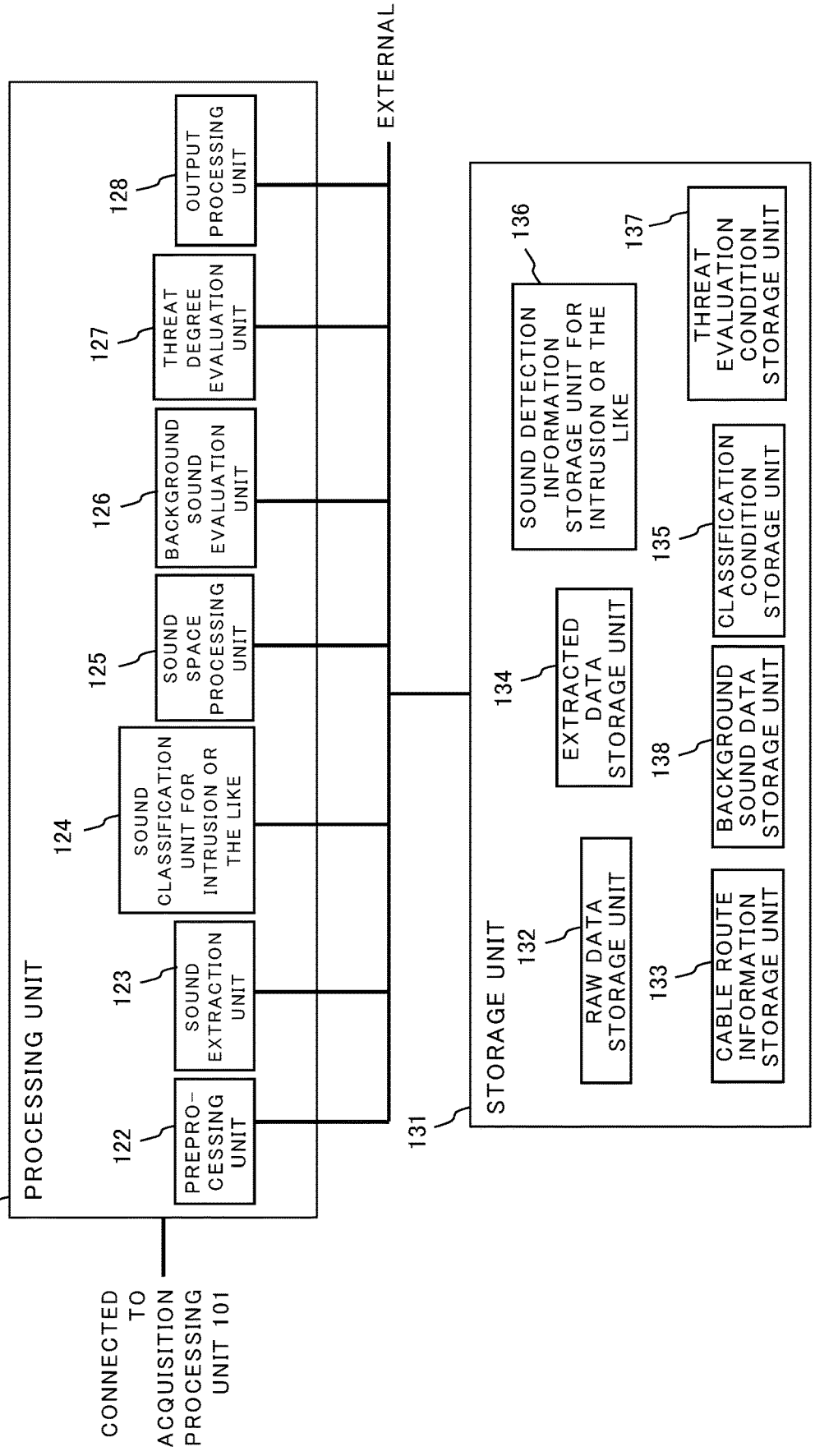
FIG. 4 is a conceptual diagram illustrating a configuration example of a water area monitoring information acquisition unit.

FIG. 4 is a conceptual diagram illustrating a configuration example of the water area monitoring information acquisition unit 120 in FIG. 1. The water area monitoring information acquisition unit 120 includes a processing unit 121 and a storage unit 131.

The processing unit 121 includes a preprocessing unit 122, a sound extraction unit 123, a sound classification unit for intrusion or the like 124, and an output processing unit 128. According to need, the processing unit 121 further includes a sound space processing unit 125, a background sound evaluation unit 126, and a threat degree evaluation unit 127.

The storage unit 131 includes a RAW data storage unit 132, a cable route information storage unit 133, an extracted data storage unit 134, a classification condition storage unit 135, and a sound detection information storage unit for intrusion or the like 136. According to need, the storage unit 131 further includes a background sound data storage unit 138 and a threat evaluation condition storage unit 137.

The RAW data described above is input to the preprocessing unit 122 from the acquisition processing unit 101 in FIG. 1. The RAW data are data representing instantaneous intensity (waveform) of a sound transmitted to an optical fiber at each time and at each measurement point (sensor position) of the optical fiber 200, as described above.

In the preprocessing unit 122, a geographic coordinate is given to RAW data for each measurement point. At a phase of RAW data, position information of each measurement point is expressed by a position on a cable (e.g., a distance from a cable end). Meanwhile, data on a geographic coordinate where a cable is installed are stored in the cable route information storage unit 133. Since a geographic coordinate of each point of the cable is previously derived by collating the both types of data, and previously stored in the cable route information storage unit 133, the preprocessing unit 122 gives the geographic coordinate to the RAW data. The RAW data that have been subjected to preprocessing such as giving a geographic coordinate are stored in the RAW data storage unit 132.

The sound extraction unit 123 extracts, by, for example, input of start information from the outside, sound data with a possibility of having been generated by intrusion or the like in a target water area, regarding RAW data in a predetermined time range and a distance range, and stores the sound data in the extracted data storage unit 134. Thereby, since sound data in which no possibility of a sound of intrusion or the like is seen are excluded, and a data amount of sound data to be a target of subsequent processing is significantly lessened, a load of subsequent processing is reduced.

The sound classification unit for intrusion or the like 124 classifies, by using information (sound kind information) representing a kind of sound, sound data of a sound generated by intrusion or the like in a water area, from each piece of sound data stored in the extracted data storage unit 134. The sound classification unit for intrusion or the like 124 performs the classification by a classification condition previously stored in the classification condition storage unit 135. Herein, the classification condition is information in which sound kind information is combined with characteristically seen information (characteristic information) included in a sound of the kind. Herein, the sound kind information includes information representing a kind of sound generated by intrusion or the like in a water area, at what time a sound is generated, whether a kind of sound is a kind that is to be subjected to same sound integration processing which is described later, whether a kind of sound is a kind that is to be subjected to tracking processing of a moving sound source which is described later, and the like. The sound classification unit for intrusion or the like 124 stores a classification result by the sound kind information of a sound, in the sound detection information storage unit for intrusion or the like 136.

The sound classification unit for intrusion or the like 124 performs the classification processing by, for example, subjecting a sound of the extracted sound data to analogical determination in light of the classification condition described above.

The characteristic information included in the classification condition is, for example, information relating to a frequency of a detected sound. A sound generated by intrusion or the like in a water area may have a unique frequency, and in such a case, it is possible to classify, from the frequency of the sound, a kind of agent of intrusion or the like and a behavior thereof. For example, a center frequency or a frequency band is assumed as the information relating to the frequency. For example, it is known that a frequency band of an engine sound or a screw sound of a ship, a motor sound of an underwater scooter, or the like is approximately fixed, and it is possible to classify the kinds from a frequency band of a sound.

Alternatively, the classification condition is, for example, an interval of a sound. Some kind of agent of intrusion or the like may generate a sound at an interval that is fixed to some degree, such as an exhaust sound of a diver. In such a case, it is possible to classify a kind of agent of intrusion or the like by using the interval of the sound as the characteristic information.

Alternatively, the characteristic information included in the classification condition is, for example, a pattern of a sound representing a temporal transition of a frequency band of a sound. More accurate classification of an agent of intrusion or the like becomes possible by using a pattern of a sound.

The background sound evaluation unit 126 detects a behavior such as intrusion by detecting a phenomenon such as interception of background noise by an agent of intrusion or the like. A processing content will be described later in <Processing 6>.

The sound space processing unit 125 collects sound data detected at each point of an optical fiber sensor, and identifies a sound source and an orientation thereof. A processing content will be described later in <Processing 5>.

The output processing unit 128 reads and outputs sound detection information of intrusion or the like in a predetermined time range and a sensor position range from the sound detection information storage unit for intrusion or the like 136 according to, for example, instruction information from outside. An output destination concerning the output is, for example, an external display, a printer, or a communication device.

Further, the water area monitoring device 140 may include a function of performing warning to an agent of intrusion or the like, or notification (detection notification of intrusion or the like) that a behavior such as intrusion is detected, to an external system or an external company that reports to a security authority or the like. The warning and detection notification of intrusion or the like are performed, for example, according to a threat evaluation value (threat evaluation information) to be described later.

Warning to an agent of intrusion or the like is also considered when there is no contact means due to the agent being unknown. In such a case, it is also considered that a security ship (patrol ship) or a drone is directed to the site, and warning using a loudspeaker or the like or warning by a searchlight or the like is performed. Taking an image or a video image to be used as an evidence of identification of an agent of intrusion or the like is also considered.

When a security ship or a drone is directed to a site or a report is made to an authority, information such as a kind of movement means of an agent of intrusion or the like estimated by the water area monitoring device 140, a kind of behavior, a history of movement, and a current place may be transmitted along with the intrusion detection information.

Note that, when the water area monitoring device 140 includes the notification function as described above, the notification is performed by the output processing unit 128 in FIG. 4. The output processing unit 128 in this case includes a communication function. The output processing unit 128 performs the above-described notification by wireless or wired transmission.

The water area monitoring device 140 may further include a function of performing mapping visualization processing combined with map information. Since the present scheme has a real-time property, efficiency of searching for an agent of intrusion or the like may be improved by transmitting, to a security ship on the ocean, information in which a place where the agent of intrusion or the like appears is mapped. The mapping visualization processing is performed, for example, by the output processing unit 128.

<Data Processing Performed by the Water Area Monitoring Information Acquisition Unit 120>

Figure 5:
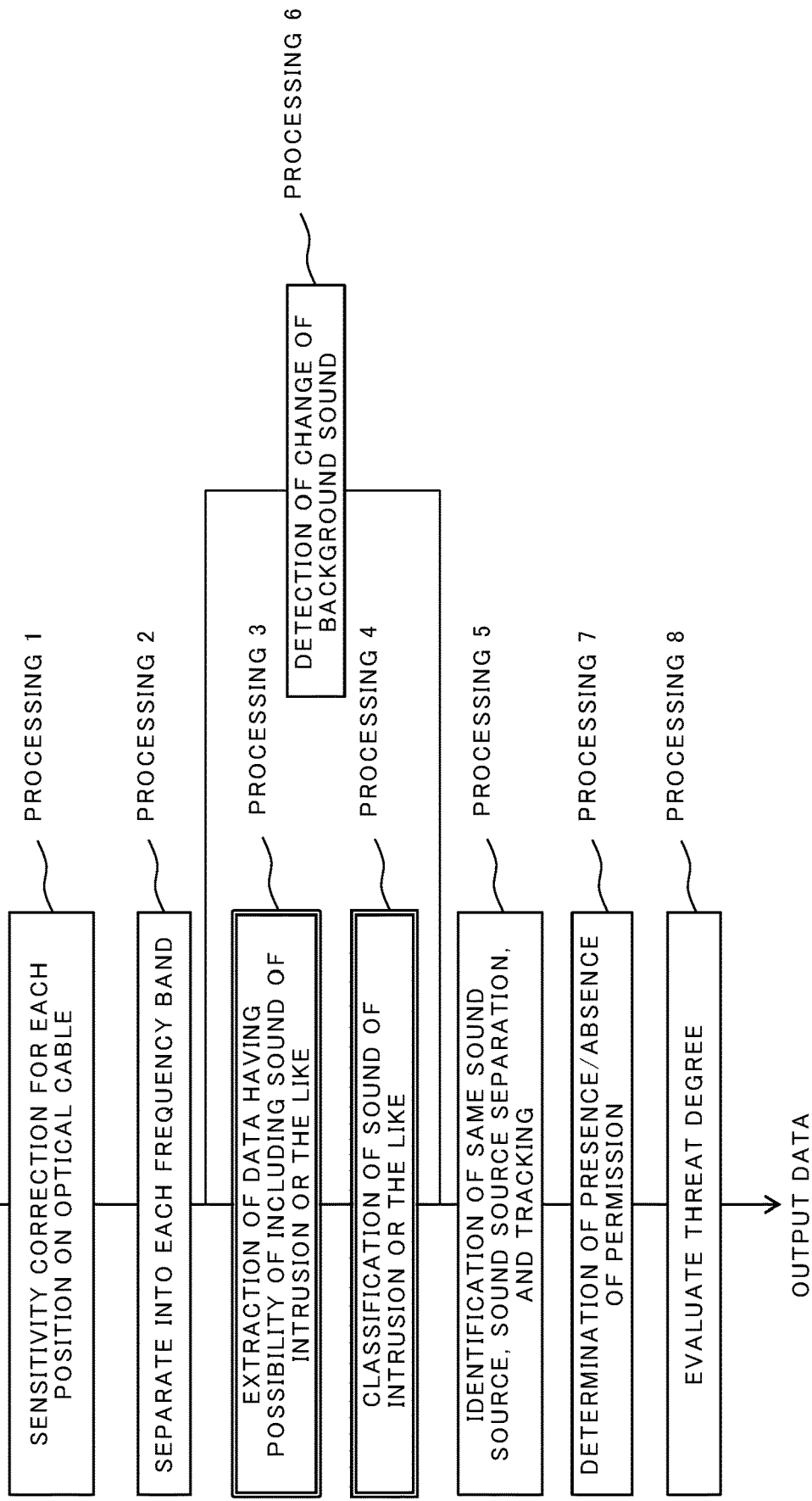
FIG. 5 is a diagram describing an outline of a processing content of the water area monitoring information acquisition unit.

FIG. 5 is a conceptual diagram illustrating a data processing example of analysis and evaluation of sound data performed by the water area monitoring information acquisition unit 120. A rough flow in which data are processed is illustrated. Among Processing 1 to Processing 8, Processing 3 and Processing 4 are considered to be performed in almost all of application scenes, and other pieces of processing may not be performed. When certain processing is not performed, data processed in previous processing are directly provided as processing target data for the next processing.

The above-described RAW data are input to the water area monitoring information acquisition unit 120 from the acquisition processing unit 101 in FIG. 1. The RAW data are data representing the instantaneous intensity (waveform) of a sound detected by an optical fiber at each time and at each measurement point (sensor position) of the optical fiber 200, as described above. The water area monitoring information acquisition unit 120 performs the following processing on the RAW data.

<Processing 1: Sensitivity Correction for Each Position on an Optical Cable>

Whether to implement Processing 1 is selected according to application status of the water area monitoring device 140 in FIG. 1. When implemented, Processing 1 is implemented in, for example, the preprocessing unit 122.

A configurational characteristic of the water area monitoring system 300 in FIG. 1 is that an underwater microphone or an underwater device is unnecessary since, for example, the optical fiber 200 included in a submarine cable is itself used as a sensor (underwater microphone). Thereby, an increase of cost due to an increase in the number of devices according to the number of observation points is avoided, and assurance of long-period reliability becomes easy since no electronic circuit is required in water. Meanwhile, a property as a sensor is not a calibrated property as in an underwater microphone, and there is a problem of exercise of a transfer function (filtering function) such as attenuation or enhancement of intensity of a specific frequency band. Further, there is a problem that the transfer function differs depending on a kind of cable, installation status, or the like. The problems are desirably corrected for classification of a sound to be described later.

[Nonuniformity of a Sensor Property: Difference of Cable Kind or the Like and Correction]

The submarine cable 920 in FIG. 2 that acquires environment information differs in a kind of cable and installation status depending on an installation place. Thereby, a property of the submarine cable 920 as a sensor differs for each place.

Herein, a difference of a cable kind is, for example, a difference of a cross-sectional structure resulting from use for power transmission, communication, or the like, a difference of a structure of a protection cover (presence or absence of an armoring wire and a kind thereof), or the like. A difference of installation status is, for example, a difference of a form in which a cable is merely placed on a sea bottom surface, a construction form in which a ditch is dug in the sea bottom and a cable is buried therein, a form in which a cable is suspended on a column standing on a water bottom, and the like.

A difference of transfer functions of the cables for each place is recognized by referring to a manufacture record or a construction record, and the records are recorded in, for example, the cable route information storage unit 133. The difference of transfer functions for each place of a cable may be substantially uniquely corrected for each place of the submarine cable 920. A specific correction method is, for example, increasing amplitude of a specific frequency band by filter processing.

Herein, the difference of transfer functions due to a cable kind and a kind of construction method is desirably recognized by previously performing an experiment, and performing a comparison with, as a criterion, sound data acquired by, for example, an underwater microphone.

Note that, a correction to the difference of transfer functions for each place of a cable is not necessarily made on an acquisition data side, and a method in which a correction is made on a classification condition side to be described later may also be considered. For example, with a property of attenuating on a high-frequency side of environment information due to a structure of a cable, it becomes easy to acquire correspondence of pattern identification in analogical determination by attenuating a high-frequency side of a classification condition according to a cable kind at an acquisition position without correcting acquisition data. However, generally, correction of an acquisition data side has an advantage such as an increase in versatility of data utilization, and is considered preferable.

[Nonuniformity of a Sensor Property: Difference of Each Site and Calibration]

A factor of a variation of a sensor property at each measurement point of the laid submarine cable 920 is not only a factor that is determined (may be estimated) uniquely from the construction record or the like described above. For example, it is because, even when a record of embedding at a uniform depth exists, embedding depth may actually vary from place to place, or covering earth and sand may be partly carried away and results in exposure of the cable.

For the problem described above, a method of calibration by utilizing, as a reference sound, a sound transmitting to a site in a wide range may be considered. For the reference sound, not only an artificial sound generated from a ship, an unmanned diving machine, or the like but also naturally generated sound may be utilized. For example, utilization of a sound of a marine organism, such as a whale, the characteristic of a generated sound of which is well known may be considered. In a case of a sound transmitting in a wide range, nearly the same sound is sensed at each point on the submarine cable 920, and, therefore, the water area monitoring information acquisition unit 120 derives a correction coefficient for each point in such a way that the sound data approximate the same, or approximate a value according to a distance from a sound source.

By the calibration, the water area monitoring information acquisition unit 120 may be caused to recognize whether each point on the submarine cable 920 is suited to acquisition of sound data emitted by an agent of intrusion or the like. A case where a certain point is not suitable for acquiring sound data is, for example, a case such as a case where the point is very low in sensitivity and may not be completely corrected, or a case where the point easily resonates on a specific frequency band and is difficult to correct. The points having some difficulty in acquisition of sound data are able to be extracted, for example, by comparing, regarding precedent and subsequent measurement points on a cable, intensity of a sound with a movement average value thereof. Hence, the water area monitoring information acquisition unit 120 excludes the points having difficulty, with distribution of an observation point in mind, and utilizes data from a point that seems to have allowed acquisition of nearly average environment information. Thereby, accuracy of observation of detection information of intrusion or the like in the water area monitoring information acquisition unit 120 may be improved.

<Processing 2: Separate into Each Frequency Band>

Whether to implement Processing 2 is selected according to application status of the water area monitoring device 140. When implemented, Processing 2 is implemented in, for example, the preprocessing unit 122.

Herein, separation for each frequency band is separating sound data for each frequency band, in such a way as, for example, an extremely low frequency to 0.1 Hz, 0.1 to 1 Hz, 1 to 10 Hz, 10 to 100 Hz, and equal to or more than 100 Hz. The setting of a frequency band is desirably performed in such a way as to be approximately classified by a range of a sound emitted by an agent of intrusion or the like.

There are broadly two reasons that sound data may be evaluated separately for each frequency band. One reason is that a frequency band of a sound generated by an agent of intrusion or the like is approximately divided by a kind of agent of intrusion or the like or a kind of behavior thereof. Thus, it becomes easy to perform analogical determination in classification processing to be described later, by separating sound data for each frequency band.

The other reason is for removal of sound data concerning a sound other than a sound of intrusion or the like. For example, in a place where a sound other than a sound of intrusion or the like is loud, such as a place where a wave dashes against a shore, the water area monitoring information acquisition unit 120 separates the sound for each frequency band, and performs classification processing to be described later on a frequency band on which a sound other than a sound of intrusion or the like is not loud, and a sound of intrusion or the like is comparatively loud. In such a case, the water area monitoring information acquisition unit 120 is able to reduce an influence of a sound other than a sound of intrusion or the like on monitoring of a sound of intrusion or the like.

For such a reason, it is preferable that sound data are separately evaluated for each frequency band of a sound.

<Processing 3: Extraction of Data Having a Possibility of Including a Sound of Intrusion or the Like>

Processing 3 is processing implemented in many cases. Processing 3 is implemented in, for example, the sound extraction unit 123. The extraction processing is a processing for extracting, for example, a rapid change of intensity of sound data from a movement average trend, by threshold value excess determination.

Thereby, sound data that have been determined to have no possibility of including a sound of intrusion or the like are excluded, and a sound data amount to be a target of processing performed thereafter is diminished.

<Processing 4: Classification of a Sound of Intrusion or the Like>

Processing 4 is processing implemented in many cases. Processing 4 is implemented in the sound classification unit for intrusion or the like 124. For example, as disclosed in PTL 2, a technique of automatically identifying a kind of agent of intrusion or the like and a behavior thereof from a sound picked up by an underwater microphone has been actively studied and developed. The water area monitoring device 140 performs similar processing regarding a sound picked up by optical fiber sensing.

There are roughly two methods of classification processing to be performed by the sound classification unit for intrusion or the like 124. One is a method called a voiceprint identification technique, that previously finds out an identification condition made up of a combination of a plurality of conditions of characteristic amounts regarding a sound for differentiating a kind of agent of intrusion or the like and a behavior thereof, and performs determination according to the identification condition. A specific example of the method will be described later. The other is a method called machine learning, particularly, deep learning, that inputs, to a multilayer hierarchical neural network, a large number of pieces of labeled data indicating what it is, causes the multilayer hierarchical neural network to learn the data, acquires a learned model, and uses the model for identification. The identification techniques are one example, and may be used in combination, or a newly developed analysis method may be used.

An example described next is an example of the former method that performs identification by use of a classification condition, i.e., an identification condition made up of a combination of a plurality of conditions of characteristic amounts. While a classification condition is unnecessary in a method using a learned model, specific description thereof is omitted herein, and four specific examples are described regarding a method of performing analogical determination by using a classification condition. The examples are some examples of a process of analogical determination, and not all of the examples are described.

A first specific example of a classification operation of the sound classification unit for intrusion or the like 124 is described.

It is assumed that the classification condition storage unit 135 stores, as a classification condition, "when a frequency of a sound is within an allowable range ±B [Hz] around AAA [Hz], the sound is a sound of an agent of intrusion or the like CCC." Herein, it is assumed that the value B is a value sufficiently smaller as compared with the value AAA.

Herein, it is assumed that a frequency of a sound included in extracted data read from the extracted data storage unit 134 is within AAA±B [Hz]. In such a case, the sound classification unit for intrusion or the like 124 classifies a sound included in the extracted data as a sound of the agent of intrusion or the like CCC, and stores a classification result in the sound detection information storage unit for intrusion or the like 136.

A second specific example of a classification operation of the sound classification unit for intrusion or the like 124 is described.

It is assumed that the classification condition storage unit 135 stores, as a classification condition, "when a temporal interval of a sound is within an allowable range ±E seconds around DDD seconds, the sound is a sound emitted by the agent of intrusion or the like CCC." Herein, it is assumed that the value E is a value sufficiently smaller as compared with the value DDD.

Herein, it is assumed that a temporal interval of a sound included in extracted data read from the extracted data storage unit 134 is within DDD±E seconds. In such a case, the sound classification unit for intrusion or the like 124 classifies that a sound included in the extracted data is a sound emitted by the agent of intrusion or the like CCC, and stores a classification result in the sound detection information storage unit for intrusion or the like 136.

A third specific example of a classification operation of the sound classification unit for intrusion or the like 124 is described with reference to FIGS. 6 and 7.

Figure 6:
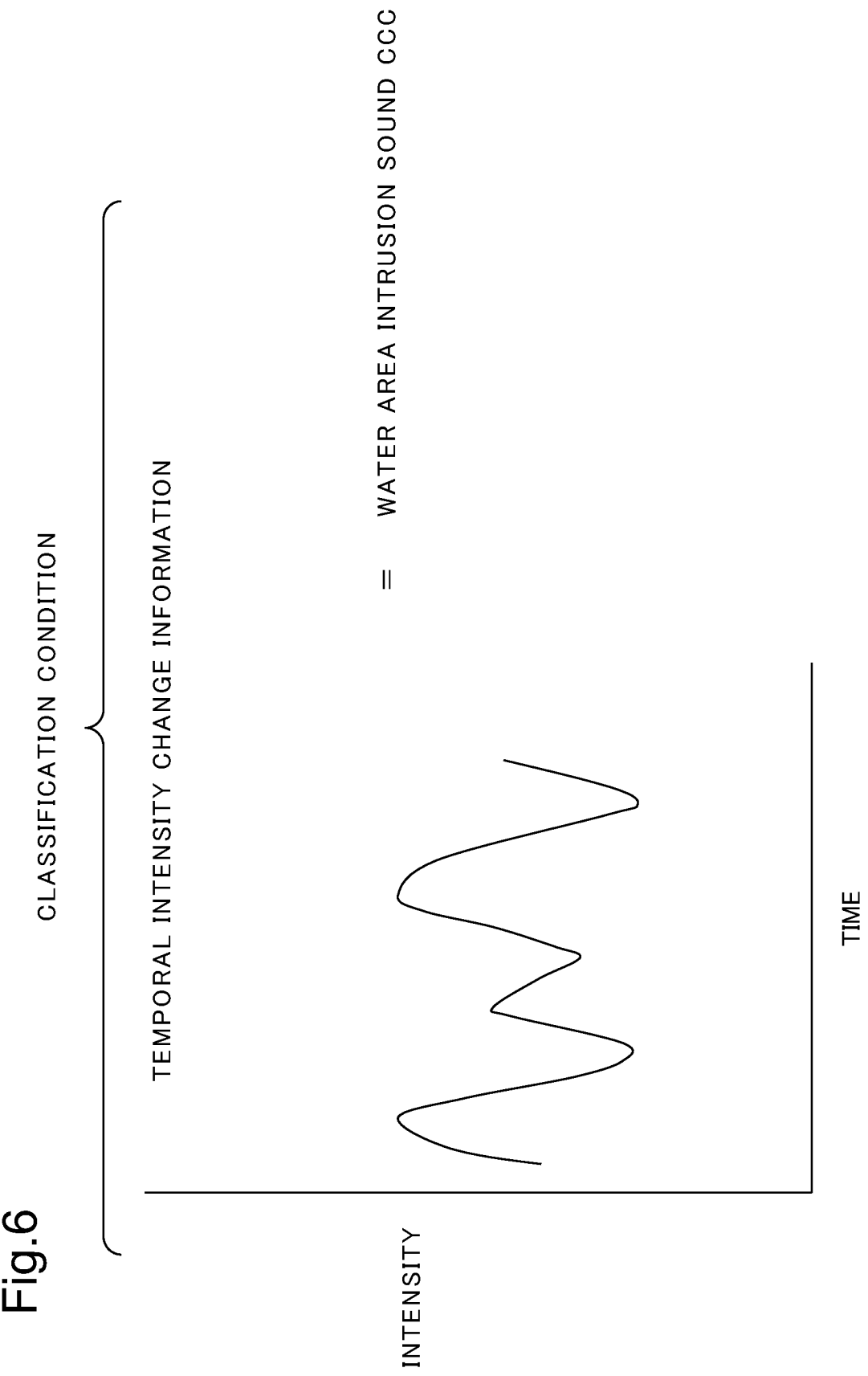

Herein, it is assumed that the classification condition storage unit 135 stores, as a classification condition, "a temporal change pattern of intensity of a sound represented in FIG. 6 is a sound emitted by the agent of intrusion or the like CCC."

Figure 7:
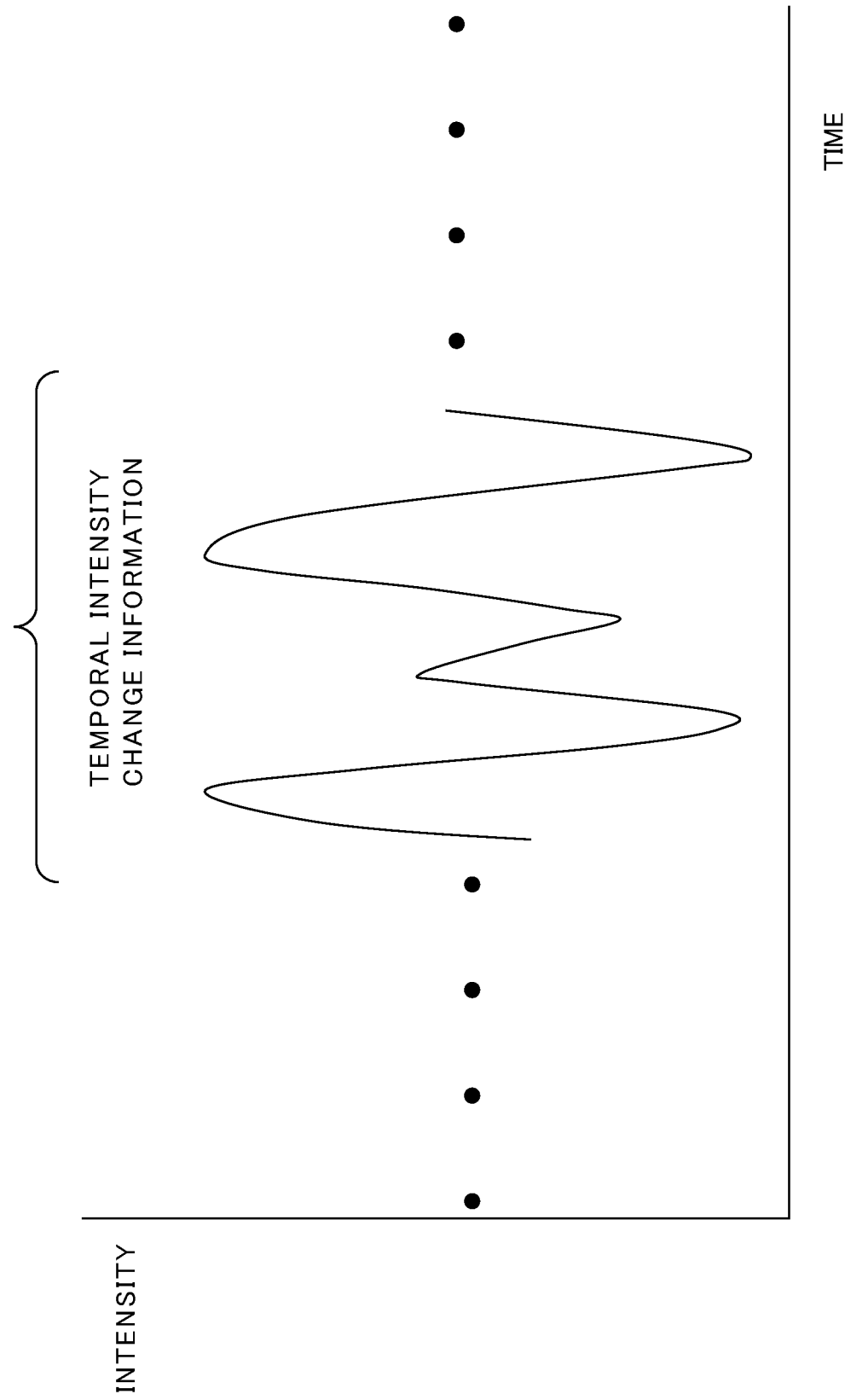

Herein, it is assumed that there is, in extracted data read from the extracted data storage unit 134, a period including a temporal intensity change in FIG. 7. The sound classification unit for intrusion or the like 124 performs analogical determination of a pattern of a temporal intensity change in FIG. 6 and a waveform of the extracted data, and determines that the pattern in FIG. 6 being a classification condition exists in the extracted data in a form of FIG. 7 with a strong correlation. The sound classification unit for intrusion or the like 124 performs the determination processing by, for example, calculation of a general cross-correlation coefficient. Then, the sound classification unit for intrusion or the like 124 classifies that a sound included in the extracted data is a sound emitted by the agent of intrusion or the like CCC, and stores a classification result in the sound detection information storage unit for intrusion or the like 136.

A fourth specific example of a classification operation of the sound classification unit for intrusion or the like 124 is described with reference to FIGS. 8 and 9.

Figure 8:
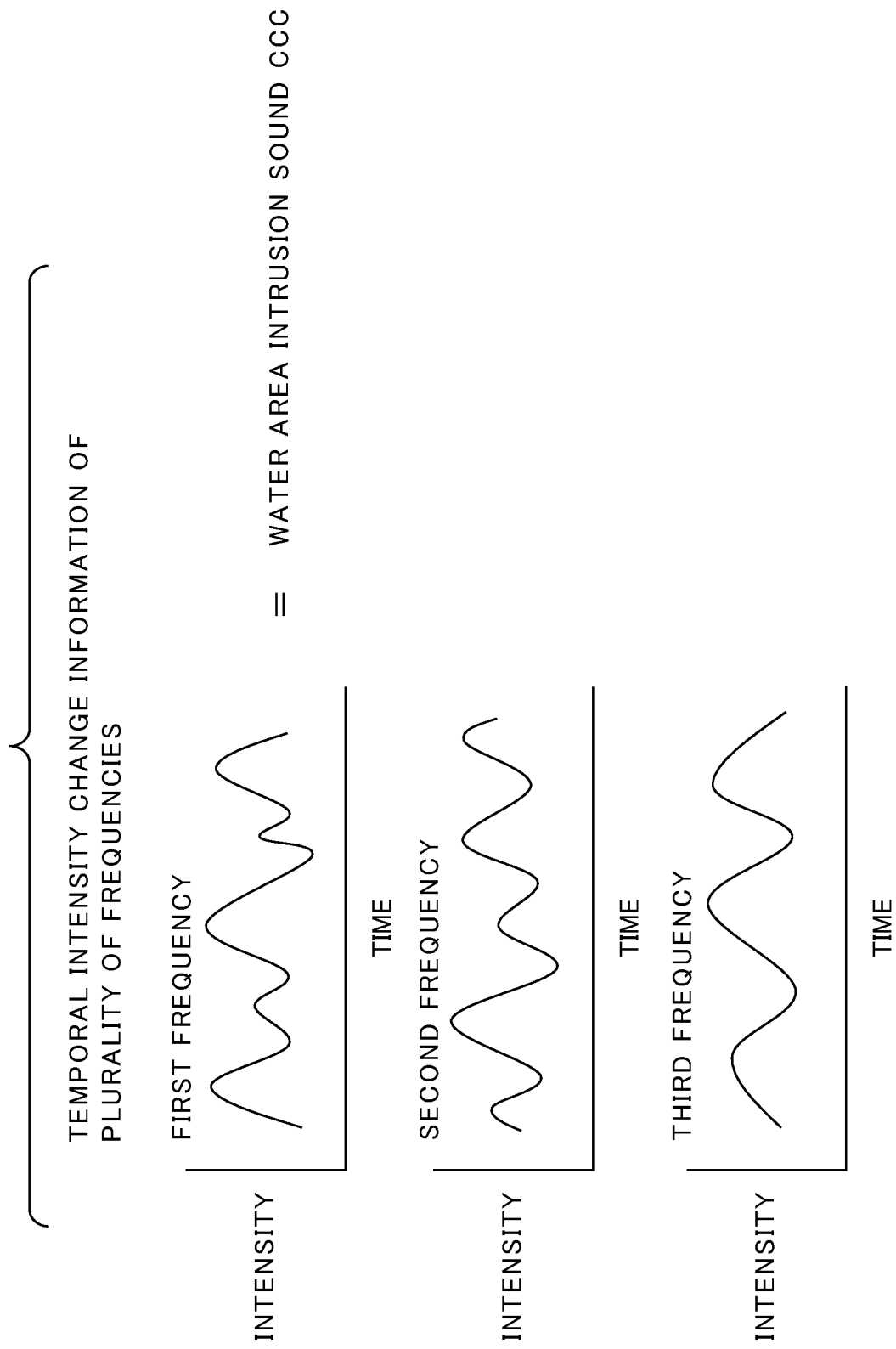

Herein, it is assumed that the classification condition storage unit 135 stores, as a classification condition, "a pattern of temporal change information of intensity of a sound regarding a plurality of frequencies (temporal intensity change information of a plurality of frequencies) illustrated in FIG. 8 is a sound emitted by the agent of intrusion or the like CCC."

Figure 9:
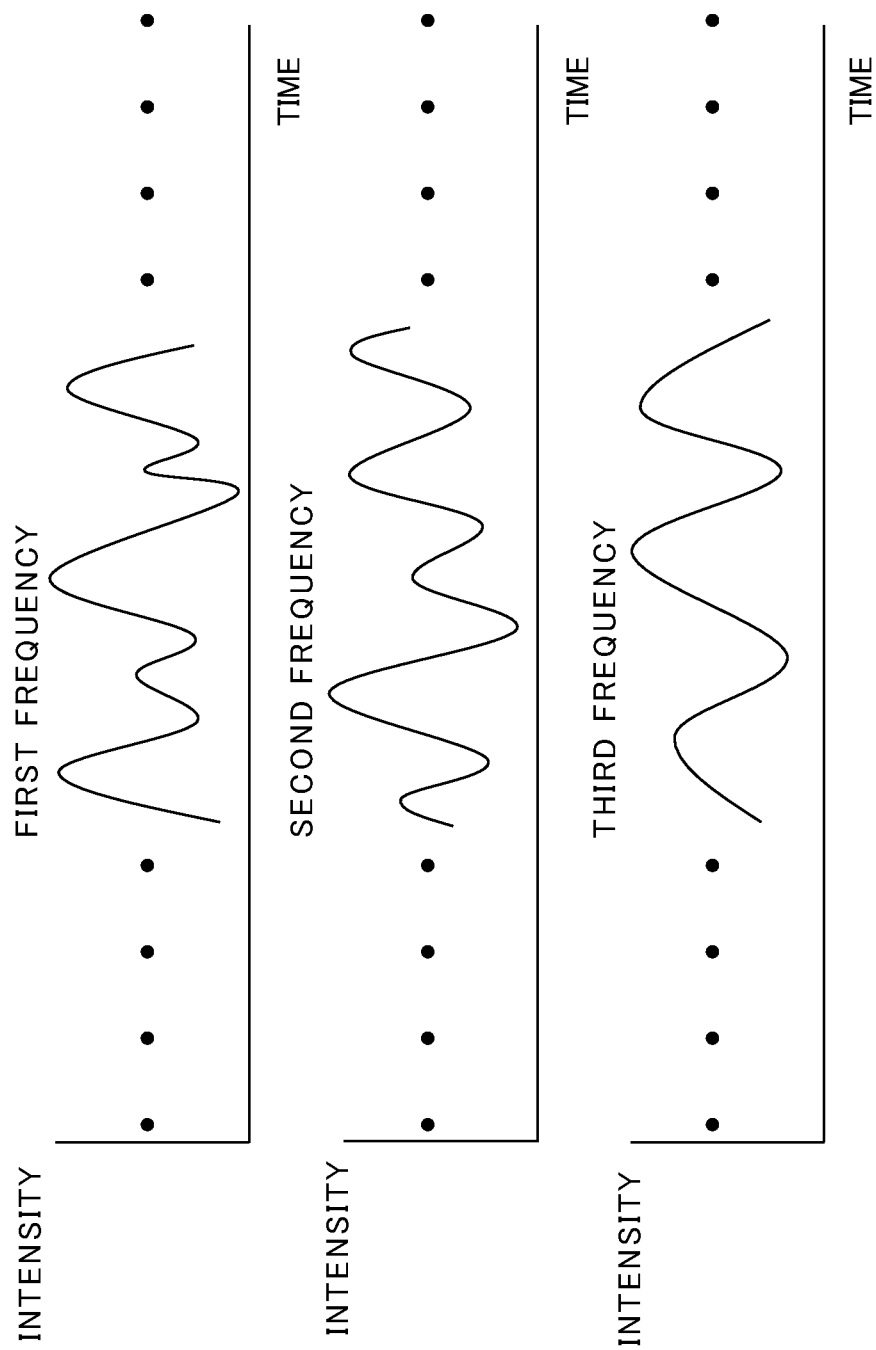

Herein, it is assumed that there is, in extracted data read from the extracted data storage unit 134, a period including the temporal intensity change information of a plurality of frequencies in FIG. 9. The sound classification unit for intrusion or the like 124 performs analogical determination of a pattern of temporal intensity change information of a plurality of frequencies in FIG. 8 and the extracted data, and determines that the pattern in FIG. 8 being a classification condition exists in the extracted data in a form of FIG. 9 with a strong correlation. The sound classification unit for intrusion or the like 124 performs the determination processing by, for example, calculation of a general cross-correlation coefficient. Then, the sound classification unit for intrusion or the like 124 classifies that a sound included in the extracted data is a sound emitted by the agent of intrusion or the like CCC, and stores a classification result in the sound detection information storage unit for intrusion or the like 136.

<Processing 5: Identification of the Same Sound Source, Sound Source Separation, and Tracking>

Whether to implement Processing 5 is selected according to application status of the water area monitoring device 140. When implemented, Processing 5 is implemented in, for example, the sound space processing unit 125.

A sound generated in a place being away from an optical cable may concentrically or spherically spread, and be detected in a plurality of places of the optical cable. Hence, the sound space processing unit 125 further analyzes a geographic coordinate of a measurement point where a similar sound is detected, and time information, and thereby estimates and identifies that the similar sounds are sounds emitted from one sound source.

Furthermore, there is also a case where a plurality of sounds are generated in a range being close in distance and time, and the sounds are detected in a plurality of places of an optical cable. In such a case, the water area monitoring information acquisition unit 120 in FIG. 1 is able to separate and individually recognize the plurality of sounds, by mainly using the following two techniques.

Technique 1. When characteristics of sounds differ from each other, the sounds may be separated and identified by the method described in Processing 4, even when the sounds are observed in such a way as to partly overlap in time.

Technique 2. Sounds from a plurality of sound sources differing in spatial position from each other may be separated and identified by use of a known sound source separation technique, even when the sounds are observed in such a way as to overlap in time. This is a merit specific to the water area monitoring system 300 in FIG. 1 that a long optical fiber itself may be utilized as a sensor array.

One example regarding the above-described processing is described. It is assumed that a propulsion sound of an underwater scooter is generated in a place being slightly away from a submarine cable. The sound spreads in water, and transmits to a plurality of parts on the submarine cable. It is assumed that the classification condition storage unit 135 in FIG. 4 retains a classification condition including, as the above-described characteristic information, characteristic amounts of propulsion sounds of various underwater scooters. Then, it is assumed that the sound classification unit for intrusion or the like 124 detects sounds similar in characteristic to a propulsion sound of an underwater scooter at a plurality of parts on a submarine cable. In such a case, the sound space processing unit 125 estimates and identifies, from detection intensity of the sound, and a detected coordinate position and a time, that the sounds are one propulsion sound generated by one underwater scooter. (An example of Technique 1 described above).

Furthermore, it is assumed that one ship sails, and an engine sound thereof transmits to a plurality of parts of the submarine cable simultaneously with a propulsion sound of an underwater scooter. In such a case, the sound classification unit for intrusion or the like 124 distinguishes between two sounds from a characteristic difference of the sounds, and the sound space processing unit 125 identifies that the sounds are one sailing sound generated by one ship and one propulsion sound generated by one underwater scooter. (An example of Technique 1 described above).

Furthermore, it is assumed that a plurality of underwater scooters of the same kind generate propulsion sounds in differing places in such a way as to overlap in time, and the propulsion sounds transmit to a plurality of parts of a submarine cable. In such a case, the sound classification unit for intrusion or the like 124 identifies, from sound data detected at the plurality of parts of the submarine cable, that the propulsion sounds are propulsion sounds of the underwater scooters. Then, the sound space processing unit 125 identifies, by applying a sound source separation technique, for example, a beam forming technique, that the sounds detected in a plurality of parts of the submarine cable are sounds generated by a plurality of sound sources in spatially differing places. (An example of Technique 2 described above).

Such processing of identifying, when one sound is detected in a plurality of parts on an optical cable, the sound as one sound becomes important when a sound source is present in a place being away from the optical cable and a distance between sound sources is sufficiently greater than a spatial resolution of optical fiber sensing. A reason for this is to prevent, by performing processing of identifying the same sound source, such a situation that, for example, the number of agents of intrusion or the like is overly measured by mistake.

Furthermore, when a sound source moves, a model in which an object emitting a sound moves may be applied by continuously performing the estimation and identification, and recognition of a speed and a travel direction of the sound source, and prediction of a position (place) of an agent of intrusion or the like a little ahead become possible.

As one example, movement of a diver by an underwater scooter is considered. The underwater scooter continuously or intermittently generates a propulsion sound such as a motor sound and a screw sound during movement. The sound classification unit for intrusion or the like 124 continues detecting the propulsion sound. Then, the sound space processing unit 125 applies an underwater scooter sound source to a model of an object moving within a space, and, thereby, a speed and a travel direction of the underwater scooter are approximately recognized, and a place that may be detected next may be approximately predicted.

In a case of applying the sound source to a model of a moving object, there is a high possibility that the sound classification unit for intrusion or the like 124 again detects a propulsion sound of the same underwater scooter. Hence, reliability of detection and classification of a sound of intrusion or the like by the water area monitoring information acquisition unit 120 may be made higher by lowering or the like of a detection threshold value of a sound of the kind. In such a case, causing the sound space processing unit 125 to estimate, in more detail spatially and temporally, a place anticipated to be detected next, or the like becomes possible. In this instance as well, by utilizing a capability of an optical fiber as a sensor array, for example, by using a known beam forming technique, tracking of a moving sound source by the sound space processing unit 125 may be facilitated.

<Processing 6: Detection of Change of Background Sound>

Whether to implement Processing 6 is selected according to application status of the water area monitoring device 140. When implemented, Processing 6 is implemented in, for example, the background sound evaluation unit 126.

In data processing illustrated in FIG. 5, Processing 3 and Processing 4 are detection analysis processing when a sound or vibration is generated due to a behavior by intrusion or the like. In contrast, Processing 6 is processing of providing a possibility of detecting even when a behavior itself by intrusion or the like generates almost no sound.

Processing 3, Processing 4, and Processing 6 may be used together.

A principle and outline of Processing 6 are as follows. A sound at each point of the optical fiber 200 installed in water or on a water bottom in a wide range is constantly monitored. The sound also includes a sound (hereinafter, referred to as a background sound) being unrelated to a behavior of intrusion or the like. The background sound evaluation unit 126 stores, in the background sound data storage unit 138, a state of a most recent background sound observed at each point of the optical fiber, and updates as appropriate. When an object intrudes into a water area, for example, an agent of intrusion or the like intrudes between a sound source of a background sound and the optical fiber 200, and, thereby, a part of the background sound reaching the optical fiber 200 is blocked. Alternatively, a travel direction is bent (diffraction). Alternatively, occurrence of a change in a way in which a background sound itself is generated is also considered. In this manner, the background sound evaluation unit 126 detects that a change has occurred in the background sound being almost constantly detected at each point of the optical fiber 200, and detects a behavior such as intrusion.

As a sound source of a background sound, a sound of a wave on a water surface, a sound of a wave coming to a shore, and the like are representative sound sources. When an object such as a ship floats on a water surface, no background sound generated by a wave is produced from the water surface on which the object floats, and a change from a time when the object does not float occurs. In addition to such a naturally-derived sound source, an artificial sound may be utilized. An artificial sound source may be a sound generated for a purpose of detecting a behavior such as intrusion, or a sound generated for another purpose, such as an operation sound of an offshore wind power generation windmill, may be utilized.

An artificial sound generated for a purpose of detecting a behavior such as intrusion may be a sound additionally applied according to need for exploration or the like of a suspicious area in detail. In such a case, the optical fiber 200 is able to detect not only blockage of a background sound but also a sound that collides with an object and is reflected thereby.

A background sound itself also changes from moment to moment, and, therefore, in order to detect a behavior such as intrusion by the temporal before-after comparison, it is desirable to take a component a temporal change of which is relatively slow, out of information acquired in a measurement of a background sound, and make a before-after comparison. For example, a before-after comparison may be made by projecting a distribution of a temporal movement average of intensity of a background sound onto a two-dimensional plane.

Processing 5 becomes also important for detection of intrusion or the like using a background sound. Specifically, processing of assuming a sound space including a sound source of a background sound from an output of a sensor array, and estimating, for example, a position and a size of an object blocking a sound is necessary. When the object moves, tracking processing becomes important.

Although not illustrated in FIG. 5, in Processing 6 as well, the water area monitoring information acquisition unit 120 may be caused to learn a manner of sound insulation in a state where a kind and a position of an object are known, and the water area monitoring information acquisition unit 120 may include a function of inferring the object from an actually acquired manner of sound insulation or diffraction state of a background sound. Further, the water area monitoring information acquisition unit 120 may include a function of evaluating a threat degree according to the inferred kind of object. These functions are equivalent to the expansion of Processing 4 and Processing 8. Specifically, evaluating an object having a weak generated sound and detection and classification thereof alone being difficult, along with a way of a change in a background sound to be detected, achieves such a matter as more certainly detecting that something has intruded, tracking, and evaluating a threat degree.

<Processing 7: Determination of Presence/Absence of Permission>

Whether to implement Processing 7 is selected according to application status of the water area monitoring device 140. When implemented, Processing 7 is implemented in, for example, the threat degree evaluation unit 127.

The output processing unit 128 may issue a trigger of an action such as caution, warning, or report to an authority when the water area monitoring information acquisition unit 120 detects an action such as intrusion or nuisance. However, a trigger of warning or report should not be issued for a ship or the like that has permission regarding entry or a behavior thereof. For example, when a poaching behavior such as abalone fishing is monitored within a bay where a work ship goes in and out on a daily basis, not only a ship that has acquired permission and performs abalone fishing but also a ship that only passes should be excluded from a target of warning or report.

As one example of a method of determining whether a ship has permission, there is a method that receives and utilizes position information service of a vessel, such as automatic identification system (AIS). Herein, AIS is a route information notification system of a vessel that mandates installation on a large vessel in international convention for the safety of life at sea (SOLAS convention) in 2002 at initiative of international maritime organization (IMO), and that has been spread to a small ship as well. When the water area monitoring device 140 receives information of AIS or the like, a position and a unique identification number of each ship are known. Thus, the water area monitoring device 140 is able to determine presence or absence of permission by acquiring, from another system, and collating an identification number of a ship that has acquired entry permission.

Another mechanism that does not require AIS is described in the second example embodiment.

<Processing 8: Evaluation of Threat>

Whether to implement Processing 8 is selected according to application status of the water area monitoring device 140. When implemented, Processing 8 is implemented in, for example, the threat degree evaluation unit 127.

As described above, the output processing unit 128 is able to also issue information to be a trigger of an action such as caution, warning, or report to an authority when the water area monitoring device 140 detects a behavior such as intrusion or nuisance. In this instance, the threat degree evaluation unit 127 is able to evaluate a degree of threat of the detected action, and output the degree from the output processing unit 128 together with detection information. A person who has received the notification performs an action according to a threat evaluation value. A condition of threat evaluation values for various detection events is previously set according to application status of the water area monitoring device 140, and is held in, for example, the threat evaluation condition storage unit 137 in FIG. 4.

A content of a threat evaluation condition is, for example, anticipation of approach of an agent of intrusion or the like to a particular place. For example, a case where the water area monitoring device 140 is used for a purpose of guarding against (monitoring) a behavior of stealing a marine product from a culture fish preserve is considered. In such a case, a monitored water area is a water area surrounding a culture fish preserve. Then, it is assumed that the water area monitoring device 140 recognizes, through Processing 4 and Processing 5 described above, a ship or the like moving in the monitored water area, including a movement direction and a speed thereof. It is assumed that, in the threat degree evaluation unit 127, a ship traveling in a direction of a culture fish preserve among the ships and the like moving in the monitored water area has a threat evaluation value being higher than that of a ship or the like headed in another direction. Further, the threat degree evaluation unit 127 infers an arrival time at a fish preserve from a speed of approaching the fish preserve and a distance to the fish preserve, and gives a higher threat evaluation value for a ship an arrival time of which is anticipated to be fast.

Alternatively, a content of a threat evaluation condition is, for example, that a kind of a detected behavior is a specific kind. For example, a threat evaluation value when the water area monitoring device 140 detects mere intrusion of a boat into a certain alert water area is set to be low. Meanwhile, for example, a threat evaluation value when the water area monitoring device 140 detects a sound being related to a poaching behavior is set to be high.

[Effect]

A water area monitoring device according to the present example embodiment monitors a behavior such as intrusion by an optical fiber sensing technique, by use of an optical fiber provided in an optical cable installed in the sea or on a sea bottom. Thus, there is no need to install an underwater microphone in the sea. The water area monitoring device according to the present example embodiment is able to transmit monitoring information to a land in real time. Thereby, the water area monitoring device according to the present example embodiment lightens labor of observation of a sound for monitoring a behavior such as intrusion, and facilitates fixed-point monitoring with high monitoring point density over a wide range. The water area monitoring device according to the present example embodiment is free of restriction of supply power, and is able to transmit all pieces of acquirable information to land.

Further, since all pieces of measurable sound data may be collected from a large number of monitoring points being slightly shifted in place, information of a kind of agent of intrusion or the like and an action thereof may be acquired in more detail by subjecting the abundant sound data to information processing such as pattern identification and sound source separation. The water area monitoring device according to the present example embodiment does not require an electronic circuit in an underwater acoustic sensor unit, and therefore is not prone to failure. Thus, the water area monitoring device according to the present example embodiment is easy to maintain over a long period, and facilitates fixed-point monitoring for a long period.

Second Example Embodiment

A second example embodiment is an example embodiment regarding a water area monitoring system to which a mechanism of automatically identifying an agent of intrusion or the like that is permitted to enter a water area being monitored is added, in addition to the first example embodiment. Hereinafter, a point of the water area monitoring system according to the present example embodiment differing from that according to the first example embodiment is mainly described.

Figure 10:
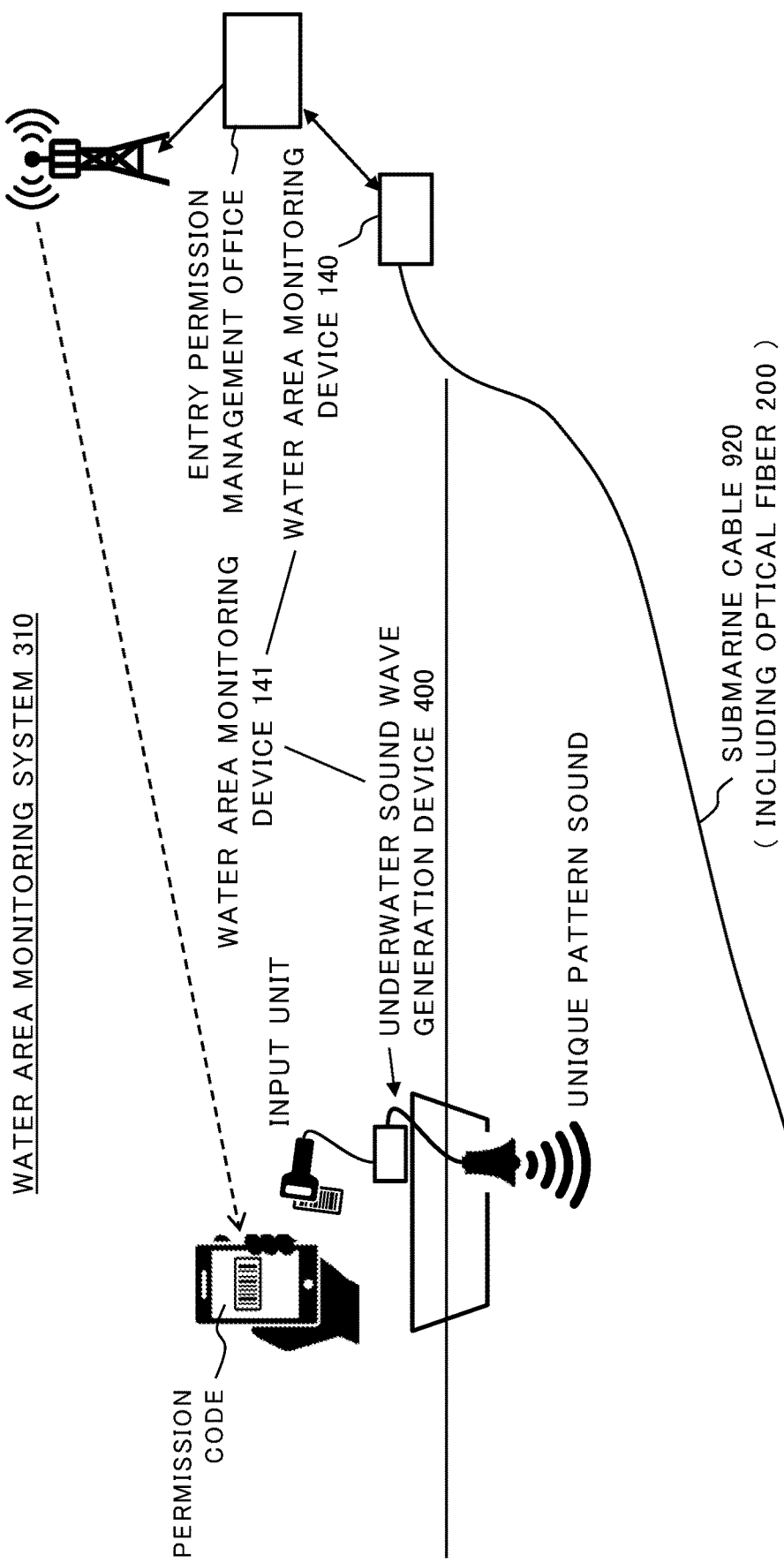
FIG. 10 is a conceptual diagram illustrating a configuration and an operation of a water area monitoring system according to a second example embodiment.

FIG. 10 is an image diagram illustrating one example of a configuration and an operation of a water area monitoring system 310 according to the present example embodiment. The water area monitoring system 310 includes, in addition to that in FIG. 1 according to the first example embodiment, an underwater sound wave generation device 400 provided in an agent of intrusion or the like having a possibility of being permitted. In FIG. 10, a combination of a water area monitoring device 140 and the underwater sound wave generation device 400 is illustrated as a water area monitoring device 141.

An agent of intrusion or the like, such as a ship, that has a possibility of entering a monitored water area includes the underwater sound wave generation device 400. The underwater sound wave generation device 400 includes a transmitter that emits a sound toward a water bottom, an input unit (e.g., a QR code (registered trademark) scanner) for key information of the entry permission pattern, and a clock (not illustrated).

A person managing the entry permission passes a permission code to the permitted person. A method of the passing may be passing, for example, a printed matter of a permission code, or may be passing a permission code by transmitting the permission code through the wireless Internet or the like, for example, by a two-dimensional figure such as a bar code or a QR code (registered trademark).

A person who is permitted to enter opens a paper, in a case of a printed matter, or displays, in a case of a wirelessly received code, the code on a terminal screen of a smartphone or the like, and reads the permission code by an input unit (a scanner or the like) of the underwater sound wave generation device 400. Hence, the underwater sound wave generation device 400 intermittently transmits, as a unique acoustic pattern being an underwater sound, a unique pattern acquired by multiplying key information and time information included in the permission code. The water area monitoring device 140 acquires the unique acoustic pattern by the optical fiber 200. Then, when the unique acoustic pattern corresponds to a unique acoustic pattern representing an entry permission in "Processing 7: Determination of presence/absence of permission" in FIG. 5, the water area monitoring device 140 excludes an agent of intrusion or the like (ship) emitting a sound of the unique acoustic pattern, from the suspicious and warning target regarding intrusion or the like.

There is a concern that a unique acoustic pattern representing entry permission may be recorded on a ship around, and the ship disguises as a permitted ship by re-transmitting the recorded unique acoustic pattern. In order to prevent this disguise, for example, a method of preparing many kinds of unique acoustic patterns in such a way that one unique acoustic pattern is effective in only one ship at one time may be adopted. Alternatively, such a measure as to periodically update a unique acoustic pattern at a predetermined interval by generation or the like of a unique acoustic pattern from a time and a secret key may be taken. A mechanism of time-linked periodic update is well known, for example, in a one-time password or the like.

Information of expiration of permission may be encrypted and included in a permission code to be transmitted by an entry permission manager to a permitted person. In such a case, after end of a permission period, the water area monitoring device 140 recognizes as an unpermitted agent of intrusion or the like since no unique acoustic pattern is transmitted into water or a unique acoustic pattern transmitted into water becomes invalid.

The water area monitoring device 140 may be configured in such a way as to notify an entry permission management office, upon detecting a person entering even after expiration of permission. In such a case, an entry permission manager may prompt a person entering even after expiration of permission to exit from a water area or pay an additional fee.

By utilizing wireless communication in this way, issuance and stop of permission may be made without directly exchanging a document or the like between the entry permission manager and each permission recipient. Cooperation with an electronic settlement system or the like enables the entry permission manager to immediately issue an entry permission code to a person who has paid an entry fee.

[Effect]

The water area monitoring system according to the present example embodiment detects, by DAS, a unique acoustic pattern generated in water as a sound only by a person who is permitted to enter a water area being monitored, and thereby determines an agent of intrusion or the like who has received entry permission and excludes the agent of intrusion or the like from the monitoring target. Thereby, the water area monitoring system according to the present example embodiment is able to suppress false warning, false report, and the like. Further, the water area monitoring system according to the present example embodiment uses wireless communication such as a mobile phone for transmission of a pattern representing an entry permission to a permitted person, and may thereby eliminate a need for labor such as labor for a person desiring a permission to go to a location or the like of a permission manager and perform a registration procedure in advance.

In the example described above, a case where an optical cable including an optical fiber is a submarine cable has been described. However, an optical cable may be an optical cable installed in a sea other than an ocean such as a bay or Caspian Sea, a lake, a river, or a canal. In such a case, the water area monitoring device according to the present example embodiment is a water area monitoring device that monitors intrusion or the like in a monitoring water area within a sea, a lake, a river, or a canal.

In addition to the above-described method using an underwater sound, a method such as an optical camera, a thermal (infrared) camera, a radar (radio wave reflection), an underwater acoustic camera, or an active sonar may be used together, as a means for monitoring a behavior such as intrusion in a monitoring water area.

Figure 11:
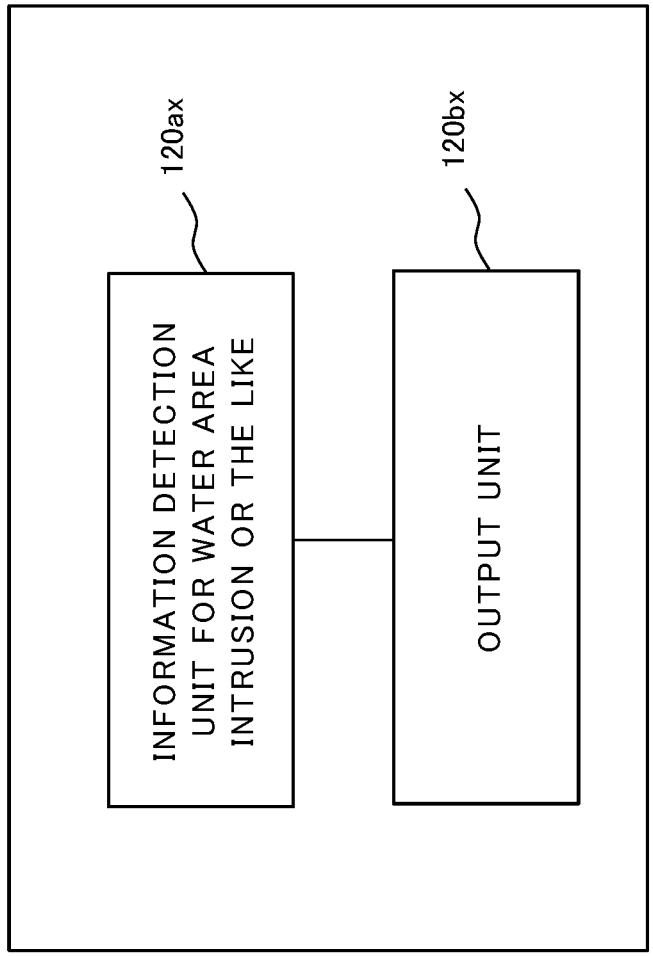
FIG. 11 is a conceptual diagram illustrating a minimal configuration of a water area monitoring device according to an example embodiment.

FIG. 11 is a conceptual diagram illustrating a configuration of a water area monitoring device 140x being a minimal configuration of a water area monitoring device according to an example embodiment. The water area monitoring device 140x includes an information detection unit for water area intrusion or the like 120ax and an output unit 120bx. The information detection unit for water area intrusion or the like 120ax detects, from sound data, at least one of a sound of water area intrusion or the like at a time when the sound data are acquired, and a change of the sound or vibration due to the water area intrusion or the like. Herein, the sound of water area intrusion or the like is a sound representing intrusion in a target water area or water area intrusion or the like being a predetermined behavior in the target water area. A change of the sound or vibration due to the water area intrusion or the like is a change of the sound or vibration due to the water area intrusion or the like from a matter that is not the water area intrusion or the like. The sound data are data being acquired by an optical fiber installed in water or on a water bottom and relating to the sound or vibration at each position of the optical fiber. The output unit 120bx outputs information representing the sound of water area intrusion or the like.

The water area monitoring device 140x is able to observe the water area intrusion or the like by utilizing an optical fiber of an optical cable laid in water or on a water bottom. Thus, the water area monitoring device 140x facilitates fixed-point observation over a wide range and for a long period. Thus, the water area monitoring device 140x provides the effect described in a paragraph of [Advantageous Effects of Invention] by the configuration described above.

While each example embodiment of the present invention has been described above, the present invention is not limited to the example embodiments described above, and a further modification, replacement, and adjustment may be made without departing from a basic technical idea of the present invention. For example, a configuration of an element illustrated in each drawing is one example for helping understand the present invention, and the present invention is not limited to the configuration illustrated in each of the drawings.

The whole or part of the example embodiments disclosed above can be described as, but not limited to, the following supplementary notes.

(Supplementary Note 1)

A water area monitoring device including:

an information detection unit for water area intrusion or the like that detects, from sound data being data acquired by an optical fiber installed in water or on a water bottom and relating to a sound or vibration at each position of the optical fiber, at least one of a sound of water area intrusion or the like being a sound representing intrusion in a target water area or water area intrusion or the like being a predetermined behavior in the target water area, at a time when the sound data are acquired, and a change of the sound or vibration due to the water area intrusion or the like from a matter that is not the water area intrusion or the like; and an output unit that outputs information representing the sound of the water area intrusion or the like.

(Supplementary Note 2)

The water area monitoring device according to supplementary note 1, wherein the information detection unit for water area intrusion or the like classifies the sound of the water area intrusion or the like by estimating a kind of the water area intrusion or an action of the water area intrusion.

(Supplementary Note 3)

The water area monitoring device according to supplementary note 2, wherein the information detection unit for water area intrusion or the like performs the classification by analogical determination in light of a previously held classification condition with one or more characteristics as a key.

(Supplementary Note 4)

The water area monitoring device according to supplementary note 2 or 3, wherein the information detection unit for water area intrusion or the like performs the classification after dividing the sound data into a plurality of frequency bands regarding the sound or vibration.

(Supplementary Note 5)

The water area monitoring device according to any one of supplementary notes 1 to 4, wherein the sound of the water area intrusion or the like is acquired by the optical fiber in such a way that sound or vibration from a matter that is not an agent of intrusion or the like being an agent of the water area intrusion or the like is changed by the agent of intrusion or the like.

(Supplementary Note 6)

The water area monitoring device according to supplementary note 5, wherein the matter that is not the agent of intrusion or the like artificially radiates the sound or vibration to the agent of intrusion or the like.

(Supplementary Note 7)

The water area monitoring device according to any one of supplementary notes 1 to 6, wherein the information detection unit for water area intrusion or the like identifies the sound data by a same agent of intrusion or the like being an agent of the water area intrusion or the like, among pieces of the sound data acquired at a plurality of the positions of the optical fiber.

(Supplementary Note 8)

The water area monitoring device according to supplementary note 7, wherein the information detection unit for water area intrusion or the like performs separation of a spatial position of the agent of intrusion or the like by use of, as a sensor array output, the sound data of the sound or vibration detected at a plurality of optical fiber positions of the optical fiber, and estimates a movement direction and a movement speed of each of the agents of intrusion or the like from a history of a position of the agent of intrusion or the like.

(Supplementary Note 9)

The water area monitoring device according to supplementary note 7 or 8, wherein the information detection unit for water area intrusion or the like tracks the agent of intrusion or the like that is moving by applying to a movement model.

(Supplementary Note 10)

The water area monitoring device according to supplementary note 9, wherein the optical fiber is provided in an optical cable, and at least one of an acquisition processing unit that acquires the sound data by the optical fiber, and transmits the acquired sound data to the information detection unit for water area intrusion or the like, and the information detection unit for water area intrusion or the like performs processing of reducing an influence on sensitivity due to a difference in installation status of the optical cable from the sound data, based on recorded information on the installation status, or an influence on sensitivity due to a difference in a kind of the optical cable from the sound data, based on information on the kind.

(Supplementary Note 11)

The water area monitoring device according to supplementary note 10, wherein at least one of an acquisition processing unit that acquires the sound data by the optical fiber, and transmits the acquired sound data to the information detection unit for water area intrusion or the like, and the information detection unit for water area intrusion or the like acquires a degree of difference due to the position where the sound data are acquired, by use of a reference sound transmitted to a wide range of the optical cable, and performs, based on information of the degree of the difference, processing of reducing, from the sound data, a difference in sensitivity due to the position where the sound data are acquired, or selects a position for acquiring the sound data.

(Supplementary Note 12)

The water area monitoring device according to any one of supplementary notes 1 to 11, further including a threat degree evaluation unit that evaluates a degree of threat of the water area intrusion or the like by comparing the sound of the water area intrusion or the like with a previously held evaluation rule condition, and derives a threat evaluation result being a result of the evaluation.

(Supplementary Note 13)

The water area monitoring device according to supplementary note 12, further including a sound wave transmitter that generates a predetermined acoustic code, wherein the threat degree evaluation unit evaluates the degree of threat to be low, regarding an agent of intrusion or the like being the agent of intrusion or the like present at a position equal to a sound source that generates the acoustic code.

(Supplementary Note 14)

The water area monitoring device according to supplementary note 13, wherein the acoustic code is changed at a predetermined timing.

(Supplementary Note 15)

The water area monitoring device according to supplementary note 13 or 14, wherein, upon input of key information of the acoustic code to the sound wave transmitter, the sound wave transmitter generates the acoustic code with which the threat degree evaluation unit recognizes that entry is permitted.

(Supplementary Note 16)

The water area monitoring device according to any one of supplementary notes 1 to 15, wherein acquisition of the sound data is performed by optical fiber sensing being distributed acoustic sensing.

(Supplementary Note 17)

The water area monitoring device according to any one of supplementary notes 1 to 16, further including an acquisition processing unit that acquires the sound data by the optical fiber, and sends the acquired sound data to the information detection unit for water area intrusion or the like.

(Supplementary Note 18)

A water area monitoring system including the water area monitoring device according to any one of supplementary notes 1 to 17, and the optical fiber.

(Supplementary Note 19)

A water area monitoring method including:

detecting, from sound data being data acquired by an optical fiber installed in water or on a water bottom and relating to a sound or vibration at each position of the optical fiber, at least one of a sound of water area intrusion or the like being a sound representing intrusion in a target water area or water area intrusion or the like being a predetermined behavior in the target water area, at a time when the sound data are acquired, and a change, due to the water area intrusion or the like, of the sound or vibration with, as a sound source, a matter that is not the water area intrusion or the like; and outputting information representing the sound of the water area intrusion or the like.

(Supplementary Note 20)

A water area monitoring program causing a computer to execute:

processing of detecting, from sound data being data acquired by an optical fiber installed in water or on a water bottom and relating to a sound or vibration at each position of the optical fiber, at least one of a sound of water area intrusion or the like being a sound representing intrusion in a target water area or water area intrusion or the like being a predetermined behavior in the target water area, at a time when the sound data are acquired, and a change, due to the water area intrusion or the like, of the sound or vibration with, as a sound source, a matter that is not the water area intrusion or the like; and processing of outputting information representing the sound of the water area intrusion or the like.

(Supplementary Note 21)

The water area monitoring device according to supplementary note 3, wherein the characteristic being used for the classification includes at least one of a frequency, a temporal change of a frequency, and a temporal change of an intensity envelope, of the sound data.

(Supplementary Note 22)

The water area monitoring device according to any one of supplementary notes 1 to 17, further including a notification unit that performs a notification for performing at least one of caution or warning to an agent of intrusion or the like being an agent of the intrusion or the like, imaging of the agent of intrusion or the like by directing a security ship, a patrol ship, a drone, or the like, and report to an authority concerned regarding the intrusion or the like.

(Supplementary Note 23)

The water area monitoring device according to supplementary note 10 or 11, wherein the optical cable is shared with another application by separating an optical fiber core wire of the optical fiber, or separating a wavelength.

(Supplementary Note 24)

The water area monitoring device according to supplementary note 12, wherein the threat degree evaluation unit performs evaluation of the degree of threat from a kind of the sound of the water area intrusion or the like, or a detection place or a movement speed.

(Supplementary Note 25)

The water area monitoring device according to any one of supplementary notes 13 to 15, wherein the acoustic code is generated by multiplying a time by an encryption key.

(Supplementary Note 26)

The water area monitoring device according to supplementary note 15, wherein the key information of the acoustic code is wirelessly sent from a person who permits entry into the target water area to a person for whom the entry is permitted.

(Supplementary Note 27)

The water area monitoring device according to any one of supplementary notes 13 to 15, wherein the sound wave transmitter is assumed to be held or possessed by a person for whom entry into the target water area is permitted.

Note that, the "optical fiber" in the supplementary note described above is, for example, the optical fiber 200 in FIG. 1. The "information detection unit for water area intrusion or the like" is, for example, a part, for detecting a sound of the water area intrusion or the like, of the water area monitoring information acquisition unit 120 in FIG. 1. The "output unit" is, for example, a part, for outputting a sound of the water area intrusion or the like, of the water area monitoring information acquisition unit 120 in FIG. 1.

The "water area monitoring device" is, for example, the water area monitoring device 140 in FIG. 1. The operations in supplementary notes 2 and 3 are associated with, for example, Processing 4 in FIG. 5. The operation in supplementary note 4 is associated with, for example, Processing 2 in FIG. 5. The operations in supplementary notes 7, 8, and 9 are associated with, for example, Processing 5 in FIG. 5.

The "optical cable" is, for example, the submarine cable 920 in FIG. 2 or 10. The operations in supplementary notes 10 and 11 are associated with, for example, Processing 1 in FIG. 5. The operation in supplementary note 12 is associated with, for example, Processing 8 in FIG. 5. The "sound wave transmitter" is, for example, the underwater sound wave generation device 400 in FIG. 10.

The "acquisition processing unit" is, for example, the acquisition processing unit 101 in FIG. 1. The "computer" is, for example, a computer that the water area monitoring device 140 in FIG. 1 includes. The "water area monitoring program" is, for example, a program that causes a computer included in the water area monitoring device 140 in FIG. 1 to execute processing. The "notification unit" is, for example, the output processing unit 128 in FIG. 4.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-156066, filed on Sep. 17, 2020, the disclosure of which is incorporated herein in its entirety by reference.

REFERENCE SIGNS LIST

100 Interrogator
101 Acquisition processing unit
103 Light source unit
104 Modulation unit
105 Detection unit
120 Water area monitoring information acquisition unit
121 Processing unit
122 Preprocessing unit
123 Sound extraction unit
124 Sound classification unit for intrusion or the like
125 Sound space processing unit
126 Background sound evaluation unit
127 Threat degree evaluation unit
128 Output processing unit
131 Storage unit
132 RAW data storage unit
133 Cable route information storage unit
134 Extracted data storage unit
135 Classification condition storage unit
136 Sound detection information storage unit for intrusion or the like
137 Threat evaluation condition storage unit
138 Background sound data storage unit
140 Water area monitoring device
200, 201, 202 Optical fiber
211 Optical coupler
300, 310 Water area monitoring system
400 Underwater sound wave generation device
920, 920a, 920b, 920c, 920d Submarine cable

What is claimed is:

1. A water area monitoring device comprising:
an information detector for water area intrusion configured to detect, from sound data being data acquired by an optical fiber installed in water or on a water bottom and relating to a sound or vibration at each position of the optical fiber, at least one of a sound of water area intrusion being a sound representing intrusion in a target water area or water area intrusion being a predetermined behavior in the target water area, at a time when the sound data are acquired, and a change of the sound or vibration due to the water area intrusion from a matter that is not the water area intrusion;
an output configured to output information representing the sound of the water area intrusion;
a threat degree evaluator configured to evaluate a degree of threat of the water area intrusion by comparing the sound of the water area intrusion with a previously held evaluation rule condition, and derive a threat evaluation result being a result of the evaluation; and
a sound wave transmitter that generates a predetermined acoustic code, wherein
the threat degree evaluator is configured to evaluate the degree of threat to be low, regarding an agent of intrusion being the agent of intrusion present at a position equal to a sound source that generates the acoustic code.

2. The water area monitoring device according to claim 1, wherein the information detector for water area intrusion is configured to classify the sound of the water area intrusion by estimating a kind of the water area intrusion or an action of the water area intrusion.

3. The water area monitoring device according to claim 2, wherein the information detector for water area intrusion is configured to perform the classification by analogical determination in light of a previously held classification condition with one or more characteristics as a key.

4. The water area monitoring device according to claim 2, wherein the information detector for water area intrusion is configured to perform the classification after dividing the sound data into a plurality of frequency bands regarding the sound or vibration.

5. The water area monitoring device according to claim 1, wherein the sound of the water area intrusion is acquired by the optical fiber in such a way that the sound or vibration from a matter that is not an agent of intrusion being an agent of the water area intrusion is changed by the agent of intrusion.

6. The water area monitoring device according to claim 5, wherein the matter that is not the agent of intrusion artificially radiates the sound or vibration to the agent of intrusion.

7. The water area monitoring device according to claim 1, wherein the information detector for water area intrusion is configured to identify the sound data by a same agent of intrusion being an agent of the water area intrusion, among pieces of the sound data acquired at a plurality of the positions of the optical fiber.

8. The water area monitoring device according to claim 7, wherein the information detector for water area intrusion is configured to perform separation of a spatial position of the agent of intrusion by use of, as a sensor array output, the sound data of the sound or vibration detected at a plurality of optical fiber positions of the optical fiber, and estimate a movement direction and a movement speed of each of the agents of intrusion from a history of a position of the agent of intrusion.

9. The water area monitoring device according to claim 7, wherein the information detector for water area intrusion is configured to track the agent of intrusion that is moving by applying to a movement model.

10. The water area monitoring device according to claim 9, further comprising an acquisition processor configured to acquire the sound data by the optical fiber and transmit the acquired sound data to the information detector for water area intrusion, wherein
the optical fiber is provided in an optical cable, and
at least one of the acquisition processor and the information detector for water area intrusion is configured to perform processing of reducing an influence on sensitivity due to a difference in installation status of the optical cable from the sound data, based on recorded information on the installation status, or an influence on sensitivity due to a difference in a kind of the optical cable from the sound data, based on information on the kind.

11. The water area monitoring device according to claim 9, further comprising an acquisition processor configured to acquire the sound data by the optical fiber and transmit the acquired sound data to the information detector for water area intrusion, wherein
at least one of the acquisition processor and the information detector for water area intrusion is configured to acquire a degree of difference due to the position where the sound data are acquired, by use of a reference sound transmitted to a wide range of an optical cable, and perform, based on information of the degree of the difference, processing of reducing, from the sound data, a difference in sensitivity due to the position where the sound data are acquired, or select a position for acquiring the sound data.

12. The water area monitoring device according to claim 1, wherein the acoustic code is changed at a predetermined timing.

13. The water area monitoring device according to claim 1, wherein the sound wave transmitter generates the acoustic code with which the threat degree evaluator recognizes that entry is permitted, upon input of key information of the acoustic code to the sound wave transmitter.

14. The water area monitoring device according to claim 1, wherein acquisition of the sound data is performed by optical fiber sensing being distributed acoustic sensing.

15. The water area monitoring device according to claim 1, further comprising an acquisition processor configured to acquire the sound data by the optical fiber and transmit the acquired sound data to the information detector for water area intrusion.

16. A water area monitoring system comprising the water area monitoring device according to claim 1, and the optical fiber.

17. A water area monitoring method comprising:
detecting, from sound data being data acquired by an optical fiber installed in water or on a water bottom and relating to a sound or vibration at each position of the optical fiber, at least one of a sound of water area intrusion being a sound representing intrusion in a target water area or water area intrusion being a predetermined behavior in the target water area, at a time when the sound data are acquired, and a change, due to the water area intrusion, of the sound or vibration with, as a sound source, a matter that is not the water area intrusion;
outputting information representing the sound of the water area intrusion;
evaluating a degree of threat of the water area intrusion by comparing the sound of the water area intrusion with a previously held evaluation rule condition, and deriving a threat evaluation result being a result of the evaluation;
generating a predetermined acoustic code; and
evaluating the degree of threat to be low, regarding an agent of intrusion being the agent of intrusion present at a position equal to a sound source that generates the acoustic code.

18. A non-transitory recording medium recording a water area monitoring program causing a computer to execute:
processing of detecting, from sound data being data acquired by an optical fiber installed in water or on a water bottom and relating to a sound or vibration at each position of the optical fiber, at least one of a sound of water area intrusion being a sound representing intrusion in a target water area or water area intrusion being a predetermined behavior in the target water area, at a time when the sound data are acquired, and a change, due to the water area intrusion, of the sound or vibration with, as a sound source, a matter that is not the water area intrusion;
processing of outputting information representing the sound of the water area intrusion;
processing of evaluating a degree of threat of the water area intrusion by comparing the sound of the water area intrusion with a previously held evaluation rule condition, and deriving a threat evaluation result being a result of the evaluation;
processing of generating a predetermined acoustic code; and
processing of evaluating the degree of threat to be low, regarding an agent of intrusion being the agent of intrusion present at a position equal to a sound source that generates the acoustic code.

* * * * *